US009942297B2

(12) United States Patent
Cioni et al.

(10) Patent No.: US 9,942,297 B2
(45) Date of Patent: Apr. 10, 2018

(54) SYSTEM AND METHODS FOR FACILITATING THE DEVELOPMENT AND MANAGEMENT OF CREATIVE ASSETS

(71) Applicants: Peter Cioni, Toluca Lake, CA (US); Michael Cioni, Los Angeles, CA (US); Christopher Peariso, North Hollywood, CA (US)

(72) Inventors: Peter Cioni, Toluca Lake, CA (US); Michael Cioni, Los Angeles, CA (US); Christopher Peariso, North Hollywood, CA (US)

(73) Assignee: Light Iron Digital, LLC

( * ) Notice: Subject to any disclaimer, the term of this patent is extended or adjusted under 35 U.S.C. 154(b) by 695 days.

(21) Appl. No.: 13/795,644

(22) Filed: Mar. 12, 2013

(65) Prior Publication Data
US 2014/0282087 A1    Sep. 18, 2014

(51) Int. Cl.
*G06F 3/00* (2006.01)
*H04L 29/06* (2006.01)
*G06F 3/01* (2006.01)

(52) U.S. Cl.
CPC .......... *H04L 65/80* (2013.01); *H04L 65/607* (2013.01)

(58) Field of Classification Search
None
See application file for complete search history.

(56) References Cited

U.S. PATENT DOCUMENTS

| | | | |
|---|---|---|---|
| 6,230,173 B1 | 5/2001 | Ferrel et al. | |
| 6,615,166 B1 | 9/2003 | Guheen et al. | |
| 6,778,760 B1 * | 8/2004 | Kagle | H04N 1/32122 386/201 |
| 7,660,416 B1 | 2/2010 | Kline | |
| 8,396,879 B1 * | 3/2013 | Cierniak | G06F 17/30958 707/750 |
| 9,609,222 B1 * | 3/2017 | Rowles | H04N 5/23293 |
| 2003/0081135 A1 * | 5/2003 | Boll | H04N 1/00458 348/333.01 |
| 2003/0163623 A1 * | 8/2003 | Yeung | H04N 1/00236 710/300 |
| 2004/0064834 A1 * | 4/2004 | Kuwata | G06F 17/30876 725/86 |
| 2004/0174434 A1 * | 9/2004 | Walker | G06F 17/30265 348/211.3 |

(Continued)

FOREIGN PATENT DOCUMENTS

WO    2011041916 A1    4/2011

OTHER PUBLICATIONS

Internet web site http://documentation.apple.com—teaches Apple final cut studio workflows Link: http://documentation.apple.com/en/finalcutstudio/workflows/Final%20Cut%20Studio%20Workflows%20(en).pdf.

(Continued)

*Primary Examiner* — Toan Vu
(74) *Attorney, Agent, or Firm* — Valauskas Corder LLC

(57) ABSTRACT

A system and methods for facilitating the sourcing of content and its management by one or more contributors or collaborators in order to assist in the development of a creative asset. Certain embodiments include one or more media devices for the receipt, review, annotation, editing, and transfer of content to assist in the formation of a creative asset such as but not limited to a motion picture.

20 Claims, 21 Drawing Sheets

(56) References Cited

U.S. PATENT DOCUMENTS

| | | | |
|---|---|---|---|
| 2004/0201752 A1* | 10/2004 | Parulski | G06F 17/3028 348/231.99 |
| 2004/0205286 A1* | 10/2004 | Bryant | H04N 5/772 711/1 |
| 2004/0230659 A1 | 11/2004 | Chase | |
| 2005/0262217 A1* | 11/2005 | Nonaka | H04N 7/17318 709/217 |
| 2006/0221351 A1* | 10/2006 | Yu | G01B 11/024 356/615 |
| 2006/0253542 A1 | 11/2006 | McCausland et al. | |
| 2007/0055926 A1* | 3/2007 | Christiansen | G06F 17/241 715/210 |
| 2007/0106551 A1 | 5/2007 | McGucken | |
| 2007/0113184 A1 | 5/2007 | Haot et al. | |
| 2007/0240060 A1* | 10/2007 | Berenbach | H04N 5/77 715/723 |
| 2007/0297786 A1* | 12/2007 | Pozniansky | G11B 27/105 396/310 |
| 2008/0113916 A1 | 5/2008 | Akella et al. | |
| 2008/0235191 A1* | 9/2008 | Dijk | G06F 17/30038 |
| 2008/0305738 A1 | 12/2008 | Khedouri et al. | |
| 2009/0060490 A1* | 3/2009 | Kuwahara | A63F 13/08 396/429 |
| 2009/0210779 A1* | 8/2009 | Badoiu | G06F 17/3082 715/230 |
| 2009/0231459 A1 | 9/2009 | Wayne et al. | |
| 2009/0300475 A1* | 12/2009 | Fink | G06F 17/3082 715/230 |
| 2010/0017694 A1* | 1/2010 | Wick | G06F 17/241 715/201 |
| 2010/0037149 A1* | 2/2010 | Heath | G06F 3/0481 715/753 |
| 2010/0083097 A1* | 4/2010 | Katz | G06F 17/30896 715/234 |
| 2010/0251142 A1* | 9/2010 | Geppert | G06F 3/04817 715/758 |
| 2010/0287236 A1* | 11/2010 | Amento | G06Q 10/10 709/204 |
| 2011/0022942 A1* | 1/2011 | Flemings | G06F 17/30899 715/230 |
| 2011/0289535 A1* | 11/2011 | Saffari | H04N 21/235 725/61 |
| 2012/0030553 A1* | 2/2012 | Delpha | G06F 17/241 715/205 |
| 2012/0167001 A1* | 6/2012 | Ortiz | G06F 3/005 715/781 |
| 2013/0124992 A1* | 5/2013 | Lyons | G11B 27/034 715/716 |
| 2013/0204957 A1* | 8/2013 | Phenner | G06Q 10/10 709/206 |
| 2013/0262999 A1* | 10/2013 | Hwang | G10L 21/06 715/716 |
| 2014/0019553 A1* | 1/2014 | Bill | G06Q 10/10 709/204 |
| 2015/0234636 A1* | 8/2015 | Barnes, Jr. | G06F 3/167 715/728 |
| 2016/0071543 A1* | 3/2016 | Yoshimine | G11B 27/034 386/280 |

OTHER PUBLICATIONS

Internet web site http://download.cnet.com—teaches MagicMix edit pro 16.0 plus Link: http://download.cnet.com/Magix-Movie-Edit-Pro/3000-13631_4-10476357.html.

Internet web site www.macnn.com—Webpage teaching video and editing news, including the latest video editing software http://www.macnn.com/tag/video+editing.

Internet web site http://en.wikipedia.org—teaches principles of Final Cut Pro movie editing software Link: http://en.wikipedia.org/wiki/Final_Cut_Pro.

Internet web sitehttp://en.wikipedia.org—teaches principles of Avid media composer movie editing software Link: http://en.wikipedia.org/wiki/Media_Composer.

Internet web sitehttp://en.wikipedia.org—teaches principles of film-making http://en.wikipedia.org/wiki/Filmmaking.

Internet web site www.corel.com—teaches Corel video editing software VideoStudio Pro X3 Link: http://www.corel.com/servlet/Satellite/us/en/Product/1175714228541#tabview=tab0.

Internet web site www.apple.com/finalcutstudio/in-action/—teaches use of Final Cut software in industry, particularly movie-making Link: http://www.apple.com/finalcutstudio/in-action/.

* cited by examiner

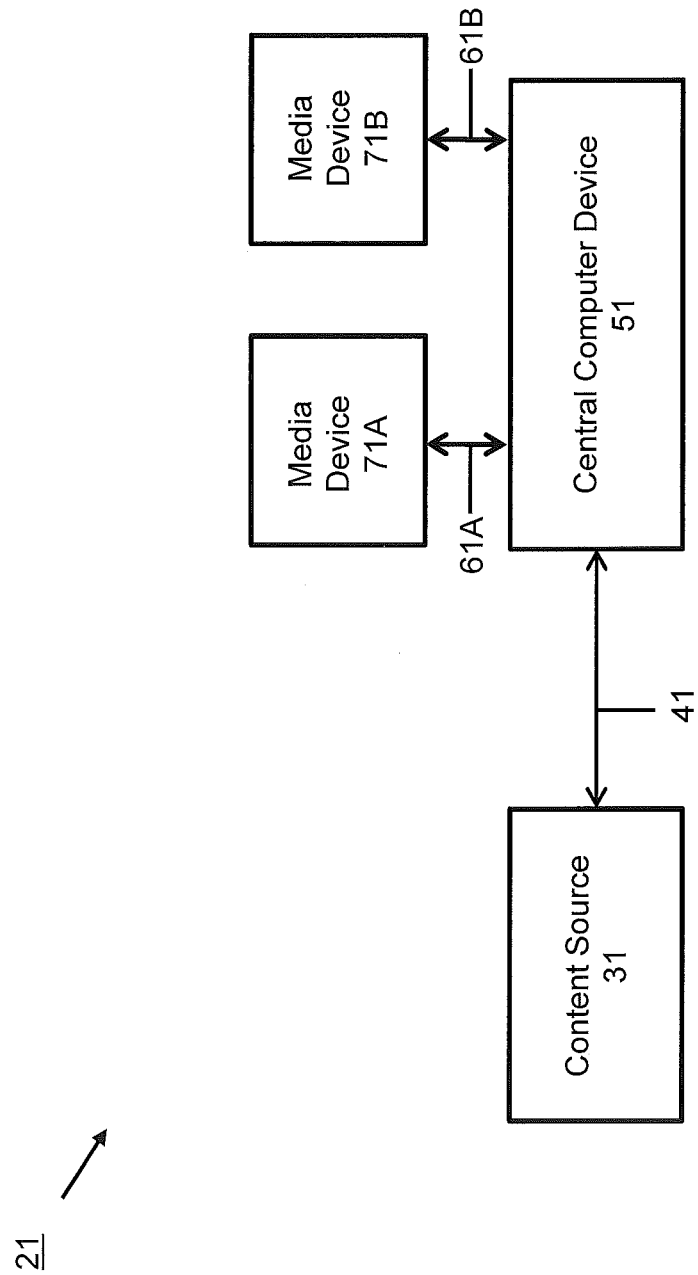

51

SYSTEM AND METHODS FOR FACILITATING THE DEVELOPMENT AND MANAGEMENT OF CREATIVE ASSETS

FIELD OF THE INVENTION

The invention relates generally to a system and methods for facilitating the development and management of creative assets. More particularly, the invention relates to a system and methods by which content may be made available for possible access, review, annotation, and modification by one or more consumers. A creative asset that can be formed from the content can include a computer program, an image, a number of images, and a sequential arrangement of images. A motion picture, used for a movie, television program, or commercial, is one example of a sequential arrangement of images. Advantageously, certain embodiments of the present invention permit the development of a creative asset to be made in an open process on an ad hoc basis and to solicit input from a wide variety of sources if and when needed or desired. Embodiments of the present invention permit communications regarding the development of a creative asset to be efficiently exchanged not only by those within a creative project—and thereby facilitate internal collaboration —, but also with others outside the creative project—and overall facilitate external horizontal collaboration and vertical collaboration.

BACKGROUND OF THE INVENTION

Many creative assets—even those which appear to be simple—are formed not through a single, short-lived burst of creativity by one individual. Instead, some creative assets result from a more extended creative process and require more than one individual to contribute content, all of which must be managed to form the final version of the creative asset.

For example, a single individual may write a computer program in a single session. However, a computer program may result from a lengthier creative effort in which one person initiates the project and one or more people join to add, subtract from, organize, or otherwise further develop the code. One or more other people may manage the creative project during which the program is prepared to ensure, for example, that the project achieves its stated objectives.

Similarly, a single individual may capture what may be considered to be a highly creative image in a single, quick, photo-capturing session. However, the same type of image may be the product of a creative project that takes place also over a longer period of time and utilizes content drawn from more than one source. For example with respect to the latter, an image of a natural-appearing landscape may be formed by layering a series of images one on top of the other to produce a complex image, even one having an illusion of depth. Each of these layers, or the components appearing in one or more of the layers, may be created at different times, may come from different sources, may be organized according to a pre-existing plan, and may be drawn together to form the complex image in post-production management.

A book in its simplest form is comprised often of text that is joined at times with other content prepared especially for the book or drawn from other sources—such as photos, charts, tables, and drawings. Traditionally, this assemblage of content was printed to form a static creative asset. A more dynamic form of such a creative asset—an electronic book, or "e-book"—may be produced by joining photos, charts, tables, drawings, and animation with text but in a digital format that allows the works to be changed as needed.

Another creative asset—a motion picture—results typically from the creative efforts of many people who develop and contribute a wide variety of content. For purposes of this application, the term "content" means any imagery, sound, text, data, choreography, functional requirements, specifications, or other information, the expression of which may be rendered in analog or digital form. Certain of the content used to produce a motion picture is acquired through the use of one or more cameras. The acquired motion picture content may be rendered in a tangible form such as an analog form on photographic film or in a digital form on a memory device. When organized and shown in an intended sequence, the rendered images can produce the illusion of movement. For purposes of this application, the terms "motion picture", "film", and "movie" will be used interchangeably.

The process of making a motion picture—termed also "filmmaking" for purposes of this application—is conducted in various stages. Certain professionals are engaged to render certain creative services and make certain contributions of creative components during one or a number of such stages.

The initial stage in making a film is known as the development stage. In this stage, a producer selects the story around which the movie will be developed. The producer then engages one or more writers to produce various creative components such as a written synopsis, step outline, a treatment, and a screenplay. Typically, drafts of these various written works are circulated among the writers for comment, addition, and correction and then submitted to the producer for additional comment and revision. Visual elements such as drawings and "storyboards" may be prepared by other professionals in order to further develop and communicate the story. A storyboard can provide a visual description of events organized as they may be seen through a camera lens. Typically, the screenplay is a series of components of continuous action organized to tell the given story, each component of which is termed a "scene".

The next stage of making a film is the pre-production stage. In this stage, many new professionals begin to make creative contributions to what may become the movie. They include the director—who, among other tasks, guides the creative direction of the movie—, one or more assistant directors, the director of photography, the sound designer or sound editor—who is charge of the audiography of the movie—, the production sound mixer—who is in charge of the sound of the movie—, an art director—who, among other tasks, works to develop the sets in which the movie is shot—, the production designer—who works with the art director to develop additional visual aspects of the movie—, the costume designer—who fashions the clothing worn by the actors in the movie—, the make up and hair designers, and the choreographer—who develops certain aspects of the movement of the actors such as in dance or fight sequences. Each of the professionals engaged during the pre-production stage may produce content and distribute it to one or more other professionals for review, comment, and correction. From such review, final versions of the content that may be used in the further development of the creative asset may be formed.

After the development and pre-production stages, the production stage begins. The production stage includes rendering a scene at a filming location. In order to render a scene at a filming location, certain or all the content developed during an earlier stage of the creative effort—such as the screenplay, costuming, choreography, scenery, make up, art elements, special effects, or lighting effect strategies—are accessed and utilized. The filming location may be any geographical location including those that are in or around a studio and those remote from the studio. The term "on-site" means the place where content is acquired by a content source in some tangible (analog or digital) form from the rendition of the scene at the filming location (and the area immediately adjacent to that place). The term "off-site" means any location other than "on-site".

Members of the movie crew, such as the director, producer, script supervisor, screenwriter and others, at times watch or otherwise review the scene being acquired by the cameras and other equipment at a vantage point known as the "video village". The video village may comprise one or more monitors—to which the audio and visual components that are being acquired are distributed (or "fed") generally in real time—, so the assembled crew members can see what is happening in the shot without hampering the rendition of the scene or the recording crew. The director and assistant director define when the recording of the audio and visual aspects of the scene begins and ends. The production stage continues until the entire content from which the movie will be assembled is recorded. Certain of the terms used in the production stage will now be discussed.

A "shot" is the context or perspective, for example, used to acquire a scene. The director—at times after collaborative discussion with the one or more persons who are working on the project—identifies the shot. The director may instruct the film crew to repeat the acquisition process to ensure that the version of the shot that the director was seeking is recorded.

A "take" refers to each recorded version of a particular shot. The director may repeat "takes" of a scene for each shot until satisfied. Takes of each shot are generally numbered starting with "take one" and the number of each successive take is increased (e.g., "take four") until it is believed that the desired version of a shot has been recorded. Accordingly, a shot in its unedited form may comprise a number of similar recorded versions, or "takes" of a scene. The script supervisor, and sound and camera crews, among others, may make (or "log") technical notes of each "take".

In contrast to a "shot", a "clip" is formed as a result of the editing process and defined as the continuous captured images ("footage") between two edits. "Stills", takes, shots, clips, scenes, and sequences form a hierarchy of certain of the creative components produced during the creation of making a movie.

The terms "shooting", "recording", "filming", "rendering", "acquiring", and "acquiring", and close variants of these terms, mean the process of making a tangible expression of the scene rendered at a filming location—typically the visual and audible aspects of and data related to a scene. These terms shall be used interchangeably in this application.

Footage shot on a particular day is quickly processed so that members of the film crew have the opportunity to review it. Traditionally, processing meant in this context printing the footage onto film—so that it can be viewed with a projector. Processing came to involve also the transfer of content onto videotape—so that the footage can be viewed on a video monitor with a VCR. Quickly processed and unedited film footage, such as that shot during a day, was often known by the term "dailies" (but are known also as "rushes" or "daily rushes"). Dailies provide the film crew with the opportunity to determine what was rendered and whether that which was rendered can be used in the preparation of the creative asset. It is generally considered imperative that the film crew review the dailies as soon as possible after a rendering session. If there is a problem with the acquired content, the scene can be reshot before, for example, the set is taken down, the weather changes, or the actors are no longer available. Dailies are often made available also to producers or movie studio executives who may not be involved in the day-to-day production so that they can determine the status of the project. Dailies can also be used as an educational tool to show students of film and others how a scene was rendered or a movie made.

The final stage of making a film is called post-production. It refers to all stages of the film-making process after the end of the shooting or the recording of the movie. The post-production stages include editing the recorded content, revising, editing, re-recording and mixing the soundtrack, creating the sound design and sound effects, performing digital intermediate, color correction, and adding special visual effects. The post-production stage typically takes longer than the actual shooting of the film.

Many of the steps used to make a movie have not changed over the years. However, the form in which movies and other content is recorded has changed. For many years, movies were recorded on tangible medium—film—simply a sheet of plastic, such as polyester, nitrocellulose or cellulose acetate, coated with an emulsion. Another tangible medium on which images and sound were recorded is videotape, that is, magnetic tape. Both film and videotape are linear, analog records of information.

The earlier analog recording systems based on film and video are in the process of being replaced by non-linear, tapeless digital systems. The process of acquiring motion pictures as digital data rather than on film is termed "digital cinematography". The term "footage" historically meant that which was recorded on linear, tape- and film-based systems. However, the term "footage" is still used when making reference to content acquired in non-linear, tapeless digital systems. In such "tapeless", or "non-tape" based recording systems, the footage is retained as data in files. For this reason, "tapeless" or "non-tape" based recording systems are also termed "file-based media", and these terms will be used interchangeably for purposes of this application. Unless clearly stated otherwise, the term "film" in the following is meant to include, but not be limited to, an analog means of acquiring or recording content.

With respect to file-based media, a single unit of storage media is generically termed a "storage media unit". A "media file" is that file to which the video or audio tracks of data—that is, the audio and/or video content or footage—was recorded. A "media device" is the apparatus that is used to "read from and/or write to" file-based storage media. A file containing the acquired content can be copied to other storage systems and devices for further processing. One such device for storage of file-based content is a large array of computer disks—a Redundant Array of Independent Disks ("RAID"). The RAID may be connected to an editing system.

Various disadvantages are associated with many current systems and methods by which creative assets are made.

First, while many creative projects may benefit by allowing more rather than fewer people to be involved in the creative process, few systems exist that can facilitate the orderly participation by many people. The systems that do exist often permit such participation only with respect to one or a limited group of creative assets.

Traditional systems also do not easily allow someone managing the development of a creative asset to distribute the partially developed creative asset or components used in its development and specify and limit the type and scope of the creative participation that is permitted. As a result, the current systems allow creatives to render assistance in areas in which none may be sought, thereby producing inefficiencies.

Additionally, certain systems require specific technologies by which content developed for the project can be received, reviewed, edited, distributed to, for example, other possible collaborators, and/or returned to the sender. As a result, in order to participate in the project, even those that may collaborate on the development on a creative asset must acquire the specific technologies to receive and review the content. The time and cost associated with the acquisition of these technologies can act as a barrier to participation and prevent wider engagement of collaborators or contributors.

Overall, existing systems do not generally allow an open development model to be used for a wide variety of creative projects. For purposes of this application, an open development model is one that allows a wide group of people to participate in the development of a creative asset. For purposes of this application, a "consumer" is anyone that can participate in the development of a creative asset and may be someone working within a creative project, someone working outside the immediate scope of a creative project but possibly within the same industry, someone working outside the creative project but in a different industry, and someone who may be the end user of the creative asset (including a member of the audience to which the creative asset is directed). As a result, among others, a consumer may be one who engages in horizontal collaboration with another consumer in the development of a creative asset (that is, consumers within the same industry) and one who engages in vertical collaboration with another consumer in the development of a creative asset (for example, a consumer outside the industry who engages another consumer within the industry in which the creative asset is developed). End users include, but are not limited to those that are the purchasers of the creative asset or a service made possible by the creative asset. Examples of end users include the public (such as the audience—when the creative asset is a movie—or those that read a book or ebook), those that may have rendered financial services or legal services with respect to the development of or have a financial or legal interest in the creative asset, those charged with maintaining the records of the development of the creative asset (such as archivists), and those that seek to learn by analyzing how the creative asset was developed, and those that are trying to determine who contributed what components to the creative asset and therefore who owns some or all the creative asset.

More specifically, there are many disadvantages associated with the systems and methods by which films are made. Overall, systems and methods do not exist in which the project can be made more participatory and collaborative either collectively or selectively in a managed orderly fashion. Accordingly, creative input cannot be easily solicited or made possible during one or more stages of the project, or with respect to only certain or all the content that is being produced for the project, or ultimately to allow a wider group of consumers including the beneficiaries or purchasers of the creative asset to participate in the project.

To illustrate, particularly with respect to how and to what extent members of the movie crew can review the acquired content and provide input during the film making process, the current system can be time-consuming, require additional technologies to conduct the review, allows often only a poor quality version of the content to be distributed to the reviewer, and provides no means by which the comments of the reviewer can be retained with the content that was provided to the reviewer. Currently, once visual and audible content and related data is acquired, it may be either quickly printed onto film or copied to videotape or digital video discs ("dvds"). Either version is of a lower quality than that which can be produced from the acquired content. To conduct a review, a reviewer must have access to either a film projector and a flat surface onto which to project the film image, a videotape player or a dvd player, and a monitor. Processing may involve printing the footage onto film—so that it can be viewed with the film projector—or onto videotape or a dvd—so that the footage can be viewed on a video monitor through the use of a VCR or DVD player. For example, the acquired content may be processed to produce a video image that, while available for quick review by the film crew, is of poor quality and low resolution and have no, or poor quality audio associated with it. The acquired visual and audible content and related data may be subjected to other processing to produce visual content and audible content that has a quality higher than that which is sent to the video village. This better quality content forms the content that is distributed to the film crew as "dailies". Despite the term, conventional processing systems employed to produce the higher quality images used as "dailies" often cannot produce and make available the higher quality images the same day as the content is acquired. Accordingly, the review of dailies often must take place more than one day after the content is acquired. However, for any one or more scenes, and the takes of them acquired on film or otherwise recorded in one day, many professionals—including, but not limited to the director, assistant director, producer, screen writer, art director, choreographer, sound designer, production designer, and costume designer—may have had some creative control over and/or may have made one or more contributions to produce that which was recorded. (Such a professional—who has made some creative contribution to or have had some creative control over some aspect of the film making process—will be termed also a "creative" for purposes of this application.) It is difficult to gather all such professionals—who may have made creative contributions that formed a portion or all of that which was used in the day's shooting—in one place for a review of the acquired content. Some such creatives—such as costume designers, model designers, set designers, directors, and choreographers—prepared that which was used on the day of shooting far in advance. If the creatives are unable to come to the location where the dailies are being shown, the creatives will be unable to review and comment on the acquired content. Errors may be overlooked. Opportunities to produce a better creative asset may be missed.

Even if the acquired content was made available to all who made a creative contribution to it, an efficient system and method does not exist by which each contributor can confirm that the contributor actually conducted such a review and has approved or not approved the content. Currently, if the creative does provide such approval or disapproval, it is dispatched in a communication that is separate from or not directly associated with the content that the creative viewed (such as simply through oral notification). Because many creatives typically make contributions to any one scene, many communications may be dispatched simply to confirm the receipt and review of one of the many scenes shot during one day of shooting.

An additional disadvantage of the current system and methods of film making is that it does not allow a contributor efficiently to make comments, offer suggestions, and provide instructions to another or other contributors or other crew members regarding the content recorded during a shoot. The current system requires that such comments, suggestions, and/or instructions be made in a separate document or documents and that the number of the scene and the number of the take be specifically identified. This is a time consuming process and one in which errors may be easily made such as in the identification of the number of the scene or take to which the communication is directed. Also, the person or persons to whom these comments are directed often must have more than one device to view the content and another to view the written comments. Such group of devices may not be particularly easy to carry and use in a coordinated fashion. If the reviewer's comments are lengthy, the person who received the comments may need to locate additional sources of electricity to power the additional device or devices.

Also, the current system and methods does not allow a contributor to make notes and add comments in close association with the content. Such notes and comments may be reviewed and considered later during the film making process such as by the same or other contributors or later by those seeking to understand the creative decisions that were made during the course of filming. The lack of archives closely associated with the content makes the creative decision-making process less transparent.

Furthermore, the current system and methods of film making does not permit a director to determine which, if any, of the professionals who had some creative responsibility over components used in a day's shoot did actually review and approve or disapprove the subject components or otherwise make comments, offer suggestions, or provide further instructions to the director or other members of the crew.

Accordingly, there is a demand for a system and methods that facilitate the timely access and review of content by one or more members of a creative group—so that a creative asset can be developed in an orderly fashion and more in line with the objectives of the creative production—or by a wider consumer group. The present invention satisfies this demand.

SUMMARY OF THE INVENTION

The present invention is a system and methods that is configurable such that content may be made accessible to a defined but potentially wide group of consumers in order obtain more creative input and overall facilitate greater collaboration during the development of a creative asset. Examples of creative assets that may be developed with the use of the present invention include books, ebooks, reports, articles, an image, computer software, applications for mobile devices, some or all the components that form a medical record, and motion pictures for movies, television program and advertisements. Consumers include those that are obligated to contribute to or collaborate on the development of a creative asset, plus vendors, service providers, or industry members that are not obligated to contribute to or collaborate on the creative asset development project but who are allowed to provide input during the creative process, the ultimate end users or consumers of the content, and members of the public who are permitted to provide suggestions or other creative input.

One embodiment of the present invention includes at least one content source, a first communication link, a central computer device, a second communication link, and a media device. Depending upon the capabilities and configuration of the second communication link and media device, the invention may include a third and possibly additional communication links to facilitate communications between the media device and one or more additional computer devices and/or one or more other media devices.

A content source is any apparatus that has or through the use of which video and/or audio or other content may be accessed and retrieved or may be acquired. The video and/or audio or other content is or may be acquired in a form that is suitable to be transferred through a system communication link and that may be stored on media for possible later access. One example of a content source is a digital camera. However, any device that has or can store or acquire content—static or dynamic—is contemplated. The storage or acquisition can occur in many contexts and places including at a filming location. The recording, for example, can take place at or near, or remote from the place of acquisition of the content. For purposes of this application, whether the content exists prior to the initiation of the use of the present system and is accessed and retrieved or the content is newly formed for purposes of the use of the present system, the following will describe this process in terms of "acquiring" and "acquisition". The terms "storage" or "storing" shall include that which is commonly known as "recorded" and "recording".

In certain embodiments, the content that is stored or acquired (collectively identified as "acquired content") is transferred through a first communication link to a central computer device. For purposes of this application, the central computer device is any apparatus or system that can assist in the management of the creative process so that the content source, for example, acquires the content in an organized fashion as media for immediate use or later access and use. Also for purposes of this application, the term "media" will refer to any "file-based media", "non-tape based media", or "tape-based media", whether tangible or intangible, analog or digital, on which the acquired content—static or dynamic—is recorded. In one embodiment, the central computer device is configured to hold the acquired content on a storage media unit such as primary data in a file—termed also a "media file" for purposes of this application. Such file-based media may be organized as a database and retained on a server for later possible access.

Certain of the preferred embodiments facilitate the association of metadata with the stored or acquired content to facilitate its use. A metadata file may be used also to facilitate the association of media files with each other on a storage media unit. For purposes of this application, the content that is first stored or acquired by the system will be termed "primary data" and the metadata that may be associated with it will be termed "primary metadata". Some of the many examples of primary metadata include the identity and/or location of the stored content, the time at or during which the storage or acquisition took place, the GPS coordinates of the location at which the acquisition took place, the identification of the crew member or members involved in the process, the shot and take number, the sample rate, and the video codec. For purposes of this application, acquired content that is further managed through the use of the central computer device is termed "rendered content".

One embodiment of a second communication link allows the primary data, with whatever primary metadata is associated with it, to be distributed (that is, "pushed") to another or others having a media device. Certain additional embodiments may alternatively or additionally make the same content simply accessible—such as to one or more authorized users—and identifiable such as through the use of the primary metadata. It is contemplated that certain embodiments of the present invention permit the file-based media to be distributed and/or made accessible in encrypted form and may require the entry of a specified login and password. It is also contemplated that the primary data (again, with whatever primary metadata is associated with it) may be pushed or made accessible between media devices through a third or additional communication links.

Visual and audible content and related data once stored or acquired can be distributed to and used by consumers, depending upon on how the content and system is configured, according to their individual and collective needs. When the consumers are those directly involved in the production of a movie, the consumers may be the film crew.

Certain preferred embodiments of the present invention include one or more media devices that are physically connected to the central computer device and/or content source components of the system. Additional embodiments of the present invention may include one or more media devices that are not physically connected to the central computer device and/or content source and may be located remote to the acquisition or computer processing location. To facilitate greater mobility, the media device may be mobile or handheld and may include any small-sized computing device having a user interface with a display screen. Examples of such devices include a personal digital assistant ("PDA"), mobile devices, smart hand-held computing device, cellular telephone, or a laptop or netbook computer, hand held console or MP3 player, tablet, or similar hand held or mobile computer device, such as an iPad®, iPod Touch® or iPhone®, and devices known as "Google Glass™".

One embodiment of the media device includes software that may be configured to facilitate the display of the primary data including primary metadata on the display screen. Certain embodiments of the media device include software by which the system may be configured also to control whether and who is permitted to review and provide further creative input regarding some or all of the creative components—that is, the file-based media—from which a creative asset may be developed. Forms of such creative input include edits, suggested edits, modifications, revisions, annotations, comments, instructions, notes, approvals or disapprovals, validations, or confirmations. Certain embodiments of the invention include a media device having a user interface through the use of which creative input may be entered. For purposes of this application, the creative input—stored as embedded metadata in association with the primary data (and primary metadata)—is termed "creative metadata".

Certain embodiments of the present invention include a media device having an user interface that includes an entry component by which creative input may be entered. One example of such an entry component is a keyboard. Embodiments of the media device may include also a graphical user interface ("GUI") viewable on the display screen of the media device. The GUI may include an entry system by which selections may be made by an user and the selections entered such that certain functions of the media device may be controlled. One example of such an entry system includes an electronic visual display that can detect the presence and location of a person's touch or the application of an inanimate object such as a stylus within or to the display area. A number of technologies have been developed to make such touchscreen functionality possible including resistive touch technology, surface acoustic wave technology, capacitive touchscreen technology, and projected capacitive touch technology. A two dimensional image of a keyboard activated by touching the keys of the keyboard (that is, a "virtual" keyboard) may facilitate the entry of selections by the user. An entry component may include elements that permit the transfer, receipt, interpretation, and/or storage of voice or other sound.

A user may use the system to select and play back particular file-based media. Certain embodiments of the media device include a user interface that is accessible to the user while the user reviews the file-based media such that the user may provide creative input including comments, instructions, and approval or disapproval, and possibly otherwise modify the copy of the primary data received or accessed by the media device including through the entry of creative metadata. Certain embodiments of such an user interface may be simplified and occupy relatively smaller portions of the display screen of the media device thereby providing more space to allow the content that is the subject of the review to be seen. Embodiments of such compact review input components include, a graphical user interface that is presented as a text box or one or more button images having identifying text.

Certain embodiments of the present invention may include a media device having software by which selective access may be provided to the copy or copies of the media files. Certain embodiments of the selective access feature permits one or more persons to be authorized to designate those who are able to access the copy of the media files, whether the designee is given access to all copies, or only certain copies, or only certain components of the copies of the media files, and what the designee is able to do to the copy of the media files to which the individual is provided access. For example, certain embodiments of the present invention allow a creative director (in the capacity of an authorized person) to designate all who made a creative contribution to the content to provide creative input regarding all creative components regardless whether the person actually made a contribution to all such content.

Alternatively, certain other embodiments of the invention allow the system to be configured so that a contributor of a certain contribution can access all content but provide creative input only with respect to that creative contribution of the contributor. With such an embodiment, the creative director may, for example, permit those that defined or contributed to the aural aspects of a movie—such as the sound designer, sound editor, or the production sound mixer—to have access to all the creative content but be able to provide creative input—such as edits, suggested edits, comments, etc. —only with respect to audio media files.

For purposes of this application, the primary data—that is, the original acquired content rendered, for example, as file-based media with its associated primary metadata—that has been distributed to another or others for review and possible submission of additional creative input, after such review and possible creative input shall be identified as "reviewed data", "reviewed file", or "reviewed content". More specifically, "reviewed data" is the primary data including primary metadata (collectively termed a "primary asset") along with any creative input expressed as creative metadata associated with the primary data.

Advantageously, certain embodiments of the present invention permit the system to be configured such that the reviewed data may be sent to one or more others for additional consideration—such as, additional comment, exchange of communication, and overall to provide additional creative input and possibly to develop a better creative asset. Such additionally considered reviewed data shall be identified as "further reviewed data". The creative input, which such others may provide, is also termed "creative metadata" for purposes of this application.

The reviewed data and further reviewed data may be sent from one or more media devices to the central computer device through use of the second communication link. Additional embodiments of the present invention may allow one or more designees to communicate the reviewed data and the further reviewed data to one or more other designees through one or more additional communication links. Such embodiments permit the copy of the reviewed data and the further reviewed data to be considered in a planned sequential fashion. For example, a certain creative or group of creatives may be provided with the first opportunity to review the primary asset after which a second and later creative or group of creatives may have the opportunity to consider the reviewed data and possibly produce further reviewed data. Such embodiments can provide an efficient teaching tool by which the creative or group of creatives who had the first opportunity to review the primary asset (the "primary creatives") can provide comments to the creative or group of creatives who receive the reviewed data (the "secondary creatives") and thereby learn from the primary creatives. For purposes of this application, the rendered content with additional creative input is termed "reviewed content" and, if subject to additional review, "further reviewed content".

Certain embodiments of the invention permit the reviewed data and further reviewed data to be archived for selected lengths of time so that, if so authorized, another or others can consider the comments, suggestions, and edits of another or others and provide additional input. The primary asset with the embedded creative metadata may be saved such as in an encoded standardized format, for example, Extensible Markup Language ("XML"), and archived within the database based upon content, date, time, or any other unique identifier. The primary asset, with the embedded creative metadata, may be accessed by one or more other mobile devices for further review. For purposes of this application, content that is archived is termed "archived content".

One advantage of the invention is that the time required for a creative to review and possibly provide comments to and edit content—including, but not limited to dailies—may be considerably reduced. Certain embodiments of the invention allow content at a filming location to be stored or acquired in the form of reviewable clips and organized by takes. The clips may be reviewed and commented upon almost immediately after each take, thereby avoiding the long waits associated with traditional review systems.

If the content that was stored or acquired is considered to be not satisfactory, appropriate remedial action can be taken including editing the acquired content or even doing another take of the scene. Re-shooting the scene represents less of a hardship because the amount of time between the acquisition of the original content and review of the acquired content can be so small that, for example, the set may not have been struck yet, or the talent may be still available, or the actors may be still in costume or makeup, or, if the scene was an exterior scene relying largely on natural light, the lighting conditions may not have changed appreciably from that time when the scene was first rendered.

Certain embodiments of the invention include communication links that may be wireless and transfer data over a distance without the use of enhanced electrical conductors or wires, although it is contemplated that in certain of the embodiments of the present invention one or more communication links may be wired. Certain embodiments of the present invention are configurable to distribute rendered content and facilitate the solicitation and provision of comments and edits through wireless or cloud technologies.

The present invention permits the primary data and primary metadata including any reviewed data to be accessed and reviewed in a timely manner such as generally real-time, or within seconds, minutes or hours from the time of rendering the content.

One objective of the present invention is to provide a system and methods by which those with responsibility over certain or all of the creative development or direction of a creative asset can review the content rendered for the creative asset and provide timely comments during the development process.

Another objective of the present invention is to provide a system and methods that facilitate the timely review of a creative asset by crew members regardless of their location and regardless the time.

An additional objective of the present invention is to provide a system and methods by which each person with responsibility over the creative direction of the creative asset can confirm that the person actually conducted such a review and has approved or not approved the rendered content in a form that is closely associated with the rendered content.

An added objective of the present invention is to provide a system and methods that utilize a simplified device to facilitate the review and entry of creative user input such as comments.

A further objective of the present invention is to provide a system and methods that facilitate the preparation of an archive closely associated with the content so that comments may be rendered that allow others to understand the creative decisions that were made and the context in which they were made during the development of the creative asset.

Another objective of the present invention is to provide a system and methods that allow comments of the crew members to be easily exchanged with other crew members.

An added objective of the present invention is to provide a system and methods that facilitate the establishment of an open development model by which a range of consumers may be allowed to submit creative input and/or to review some or all the creative input provided by some or all the crew members or other creatives during the preparation of a creative asset.

Another objective of the present invention is to provide a system and methods that facilitates not only internal collaboration but also external horizontal collaboration and/or vertical collaboration between consumers.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will be described in conjunction with the appended drawings, where like designations denote like elements, and in which:

FIG. 1B is a schematic view of another embodiment of a system for acquiring, reviewing, and processing media files according to the invention;

DETAILED DESCRIPTION OF PREFERRED EMBODIMENTS

Figure 1A:
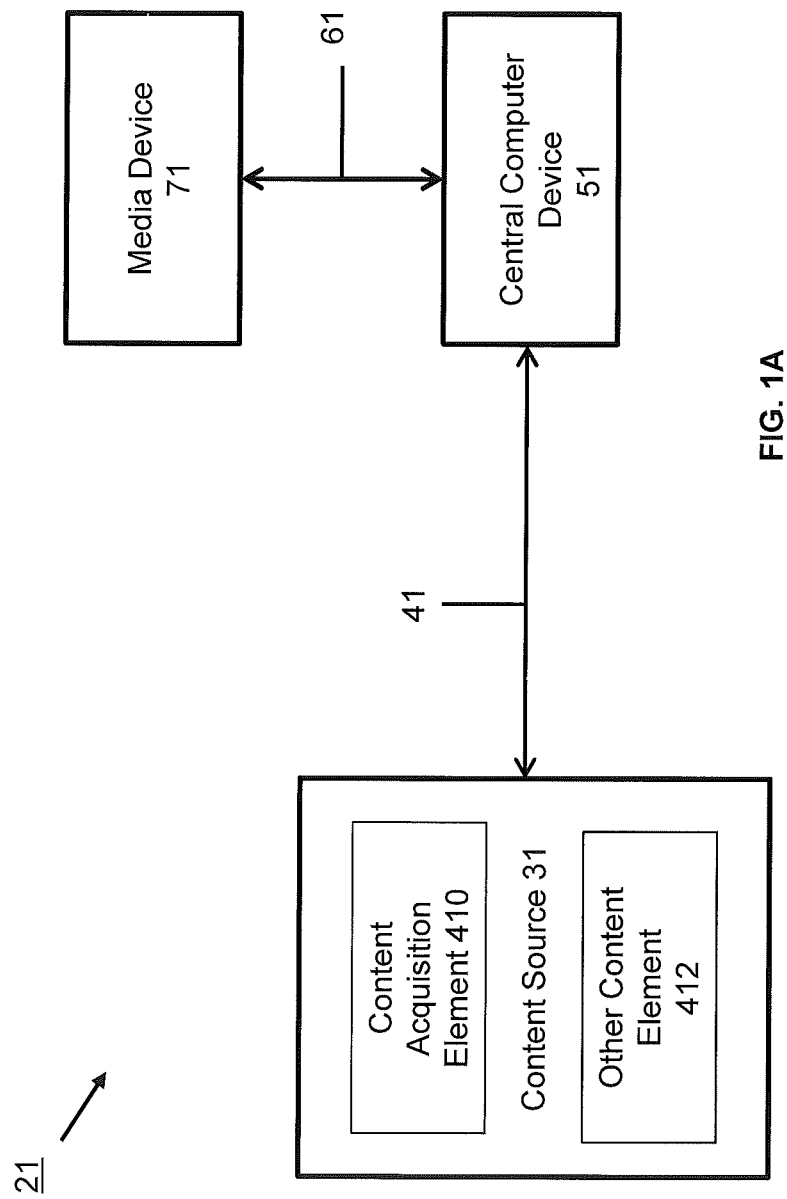
FIG. 1A is a schematic view of one embodiment of a system for acquiring, reviewing, and processing media files according to the invention.

Certain preferred embodiments of a system for facilitating the development and management of creative assets is identified in the Drawings by the number 21. Although a number of embodiments of the present invention will be described in the following, it is understood that these embodiments are presented by way of example only, not limitation. Accordingly, the detailed description of the exemplary embodiments of the invention should not be construed to limit the scope or breadth of the invention.

FIG. 1A, FIG. 1B, FIG. 1C, and FIG. 1D illustrate certain preferred embodiments of the present invention as schematic views of a system 21 by which consumers (as defined herein) may participate in an open development model with respect to the preparation of a creative asset. Embodiments of the system may be configured to permit consumers to engage in internal collaboration and/or external horizontal collaboration or vertical collaboration with other consumers and overall assist in the development of the creative asset by acquiring, reviewing, annotating, editing, processing, and transferring some or all the content used in the development of the creative asset.

More particularly, FIG. 1A illustrates one preferred embodiment of the system 21 that facilitates the sourcing of content from a content source 31, for example, as media files, the transfer of the media files through a first communication link 41 to a central computer device 51, and allows some form of or a portion or all of the media files to be made available to or transferred to a media device 71 through the use of a second communication link 61. To clarify that the source of content for use in any embodiment of the system 21 may be not only that which is obtained through one or more acquisition devices but also content from other sources that, for example, was developed wholly independent of a given new creative project, the content source 31 illustrated in FIG. 1A includes a content acquisition element 410 and an other content element 412. Elements 410 and 412 will be explained more completely below. Certain preferred embodiments of the system 21 may include a first communication link 41 through which, for example, the control of the sourcing of content may be facilitated or instructions for the sourcing of content may be transferred.

One example of a content source 31—and more specifically a content acquisition element 410—is a Red® camera. Through the use of such a content source 31, content may be found in the form of still pictures or a sequence of pictures from which a movie may be produced as primary data with primary metadata to form media files. Another example of a content source 31—and more specifically a content acquisition element 410—includes sound equipment that can acquire sound such as that sound associated with or ambient to the visual images that are acquired contemporaneously. The content that may be sourced for a creative project other than through a content acquisition element 410—that is, through an other content element 412—includes that which is drawn from reports, opinions, medical records, archives, interviews, art, and research. Content available through an other content element 412 may be made saved through a common format to permit ease of access and use. For purposes of this application, the term "content source" shall mean not only how and where the content used in this system is drawn or originates but also the one or more device through the use of which the one or more types of content may be made suitable for transfer through the first communication link 41, and possibly one or more additional communication links.

Certain embodiments of the central computer device 51 include control components by which the operation of the content source, the processing, storage in memory, and possible distribution of the media files may be managed. Certain of the preferred embodiments of the central computer device 51 may be configured to accept and store instructions such that the sourcing and processing of the media files may be managed, thereby obviating the need for any or some contemporaneous control by a manager of the device 51. For purposes of this application, the central computer device 51 may include memory or have memory associated with it on which the instructions for the acquisition of and the content that is sourced can be stored as media files within a database or other organization. Also for purposes of this application, the person or persons that provide instructions to or otherwise manage the device 51 shall be termed a "manager" or "device manager".

The preferred embodiment shown in FIG. 1A includes a second communication link 61 through which some or all the media files that are transferred through the first communication link 41 may be distributed such as to one or more media devices 71. Depending on whether and to what extent the media files are processed and configured, the media files may be reviewed, annotated, edited, and otherwise processed through the use of the media device 71. The media device 71 may include a viewing screen—through the use of which the media files may be reviewed including as static and moving images viewable as one or more screen views and sound components—and an audio system. The audio components may be provided to a user, either through direct broadcast or through the use of additional components. Embodiments of certain screen views of the media device 71 will be discussed below.

Certain preferred embodiments of the system 21 may be configurable to allow one or more consumers to manage the media files and their use by one or more media devices 71. The consumer having the authorization to designate who else may access the system 21, what media files may be accessed by the designee, and what the designee may do with the media files to which the designee is provided access shall be identified in this application as a "primary administrator".

Additional preferred embodiments of the system 21 may be configurable such that the primary administrator may permit one or more other chosen persons to select the one or more other consumers who have access to the system 21 or some or all the media files. A consumer that is authorized by the primary administrator to determine whether and who else may have access to use the system and for what purpose—in certain cases to delegate some of the responsibility which the consumer was given by the primary administrator—will be termed a "secondary administrator".

FIG. 1B is a schematic view of another preferred embodiment of a system 21 for managing the development of a creative asset according to the invention. To clarify, even though the embodiment illustrated in FIG. 1B (or FIG. 1C or FIG. 1D) does not show the two elements 410, 412, all embodiments of the system may include one or both such elements. In this embodiment, two or more second communication links 61A, 61B etc. are available to distribute or permit access to media files through the use of a plurality of media devices 71A, 71B, etc. The illustrated embodiment may be configurable to permit access to the media files or distribute the media files at the same time, or at different times, or extend only certain privileges with respect to the media files to each of the consumers using the media device 71A, 71B, etc.

Figure 1C:
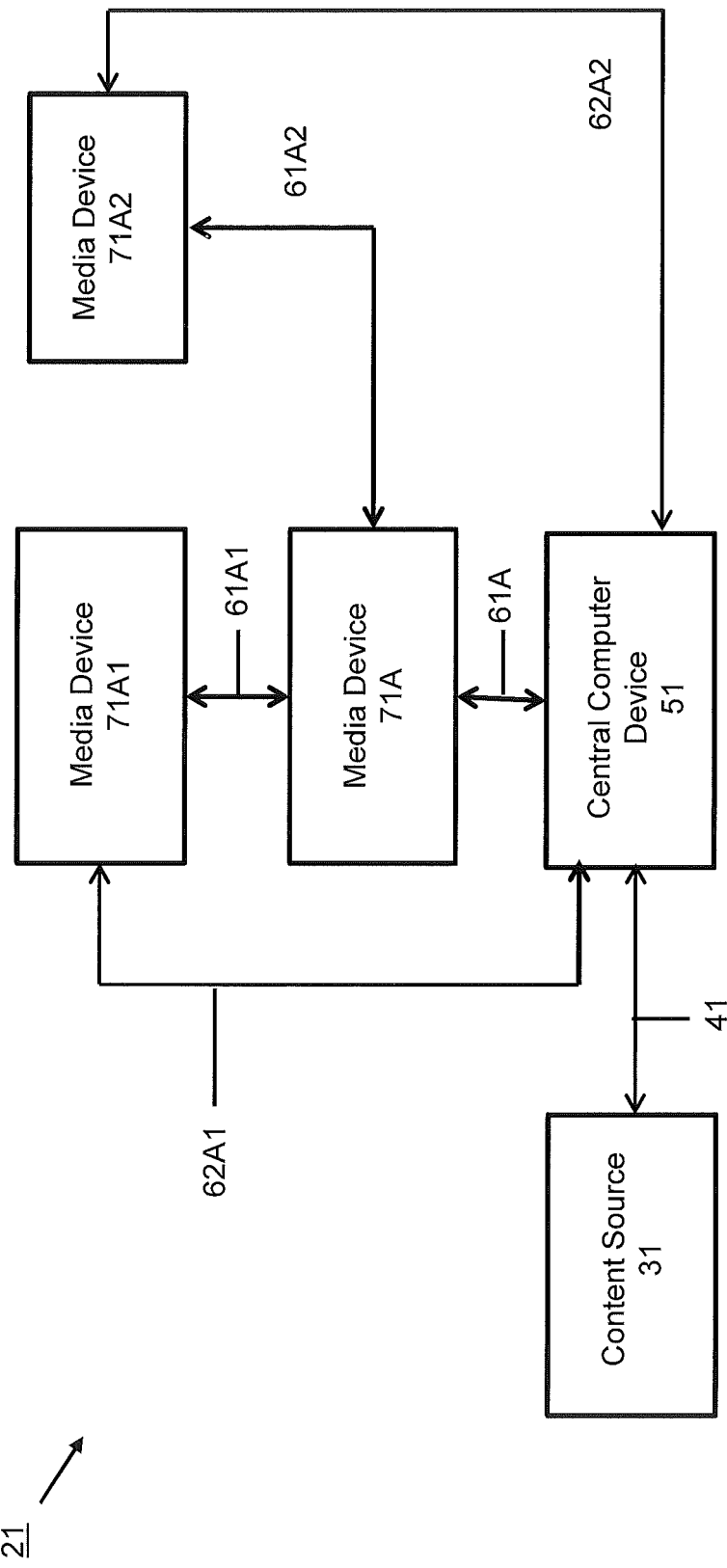
FIG. 1C is a schematic view of an additional embodiment of a system for acquiring, reviewing, and processing media files according to the invention.

FIG. 1C is a schematic view of an additional preferred embodiment of a system 21 for managing the development of a creative asset according to the invention. In this embodiment, a consumer may obtain media files through the use of one media device 71A and, depending upon the configuration chosen by the primary administrator or secondary administrator, the consumer operating the media device 71A may be authorized to distribute or provide access to some portion or all of the media files to one or more consumers operating one or more media devices, 71A1, 71A2, etc. through one or more additional communication links 61A1, 61A2, etc. The embodiment of the system 21 may include one or more direct communication links 62A1, 62A1, etc. between each of the media devices 71A1, 71A2, etc. and the central computer device 51 thereby permitting additional communication between the one or more additional media devices 71A1, 71A2, etc. and the central computer device 51.

Figure 1D:
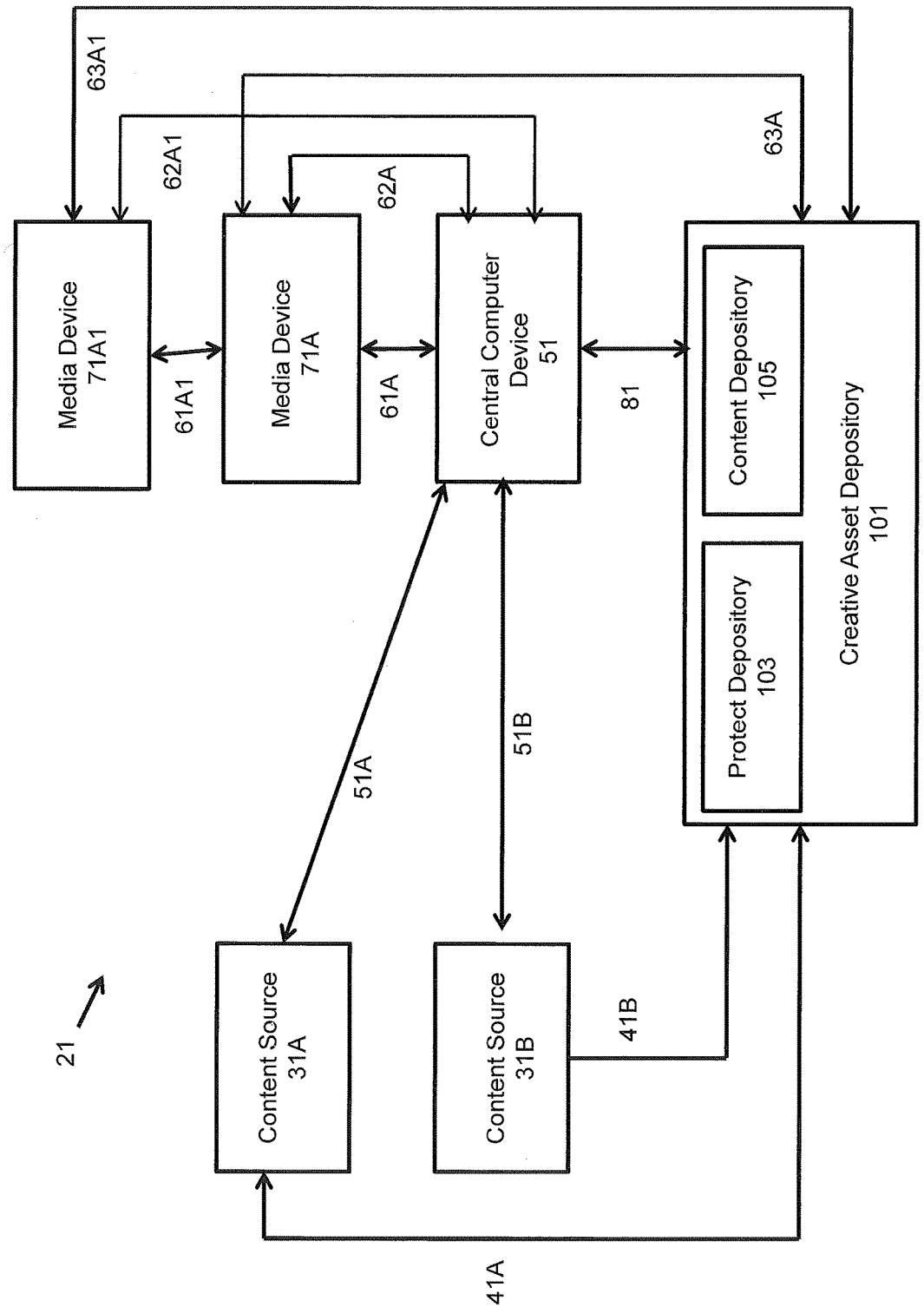
FIG. 1D is a schematic view of a further embodiment of a system for acquiring, reviewing, and processing media files according to the invention.

FIG. 1D is a schematic view of an added preferred embodiment of a system 21 for managing the development of a creative asset according to the invention. The illustrated embodiment of the system 21 includes one or more content sources 31A, 31B, etc. through the use of which content from one or more sources may be obtained. A source may provide a single content component, a collection of, or various such components. Each content source 31A, 31B, etc. may include a content acquisition element 410 and/or an other content element 412.

The embodiment of the system 21 illustrated in FIG. 1D includes a creative asset depository 101 into which content that may be used in or that is sourced specifically for the development of a creative asset may be stored. The creative asset depository may include a project depository 103 and/or a content depository 105.

The project depository 103 is configurable such that it may retain a complete collection of copies of all content prepared or sourced for the project and all documents of relevance to the creative asset development project. The retained copies may be in a digital form to facilitate the efficient identification, retrieval, and communication of one or more copies as needed. The copies within the project depository 103 of the content prepared for the creative asset development project can include screen tests, drafts, and notes. The copies of the documents stored in the project depository 103 may include agreements including scripts, financing agreements, labor contracts, and site agreements that were prepared for and are of direct relevance to a creative asset development project. The copies of information and materials that may be sourced for the creative development project may include analog or digital photos or films, texts, and drawings that were not necessarily prepared for but may have relevance to the subject creative asset development project. The copies of content that may be retained in the project depository 103 may include that which is acquired through the use of the one or more content sources 31A, 31B, etc. The objective of the project depository 103 is to provide a single source for all information and materials that are or may be relevant to a project including the content sourced for a project and the documents that needed to proceed with the project including the documents that provide the legal and financial infrastructure for the project. Access to the project depository 103 may be limited in order to ensure that a complete collection of all relevant materials and information is maintained within the depository and lessen the risk that which has been stored there has been removed. The project depository 103 may be partitioned by security measures so that access can be gained to certain information and materials that are confidential or sensitive only by the appropriately credentialed individuals. One such method of limiting access is to allow access to some or all the depository 103 only if the terms and conditions of an escrow agreement are satisfied. A bank providing financing for the creative development project may place a lien on the depository 103 and gain access to it such and when the terms and conditions of an escrow agreement are satisfied.

The content depository 105 may include a complete or selected copy of all content prepared for or otherwise sourced for use in the development of the creative asset. One preferred embodiment of the content depository 105 may include a copy of the content retained in the project depository that will be of more immediate need during the development of the creative asset and therefore may exclude, for example, earlier drafts of notes, scripts, film tests, location images, preliminary drawings and sketches, and legal, financing, and labor agreements. From the content depository 105, a copy may be drawn by or otherwise transferred to the central computer device 51 for use in the development of the creative asset. This communicated copy shall be termed also a "clone". The link by which the clone may be communicated, and through which the revised content and creative metadata may be transferred back to the creative asset depository 101 for retention is termed "content link" and identified by the number 81.

The embodiment of the system 21 illustrated in FIG. 1D includes one or more media devices 71A, 71B, etc. to which the content from the central computer device 51 may be distributed as media files. The FIG. 1D illustrated system 21 may include one or more additional media devices 71A1, 71B1, etc. to which some or all the media files are drawn from or transferred by the media devices 71A, 71B, etc. The media files produced by the user of each of the media device 71A, 71B, etc. and 71A1, 71B1, etc. may be sent or dispatched at least to the content depository 105—through links 63A, 63A1, etc.—or to the central computer device 51—through links 62A, 62A1, etc.

The embodiment of the system 21 illustrated in FIG. 1D may include a central computer device 51 that is configured to provide instructions to the one or more content sources 31A, 31B, etc. through instruction links 51A, 51B, etc. If the content source 31A is a camera, the central computer device 51 may send operating instructions to it through instruction link 51A. The central computer device 51 may be used to access the creative asset depository 101 such as through the content link 81.

The present invention advantageously allows one or more users to receive and play media files on media devices 71 so as to review and possibly provide comments or otherwise provide other input. By utilizing the communication links of the system 21, including links 61A, 61A1, the comments of the reviewer may be obtained and considered by another or others.

In one embodiment, it is envisioned that the central computer device 51 includes a server or computer that is synced with the one or more media devices 71 such that a confirmation that a certain media file has been reviewed, or any comments made with respect to or edits of the media files, may be stored on the central computer device 51 generally contemporaneously. Moreover, any changes to previous edits may also be uploaded within moments of such edits being entered. Therefore, even if multiple edits or comments are entered on the same media file from different reviewers or editors, all of those comments and edits may be reviewed. Comments or edits provide the creative metadata that is associated with the relevant media file.

In other embodiments, the creative metadata that results from all edits or comments made to one or more media file by any computer device 51 would be reviewable by others by accessing the computer device 51 at which the creative metadata is saved. The creative metadata created may be saved as one file or multiple files.

In the one file format, any changes made by one editor would apply to all media files viewed by other users. Thus, different views on edits to a particular button would not be discernable since one summary of the creative metadata would be created.

In other embodiments, each reviewer may have a separate file associated with each reviewer's comments or edits. In this example, differences in edits or comments between the reviewers may be noted and discussed before a final decision regarding a certain feature of the take is determined.

In yet other embodiments, the director, another editor, or creative director may be able to override or erase comments or edits made by other creatives and make available an authorized set of comments or edits. Such embodiments allow a person or persons having primary responsibility over the creative direction of a project to solicit comments or edits from a group, yet maintain creative control.

Figure 2:
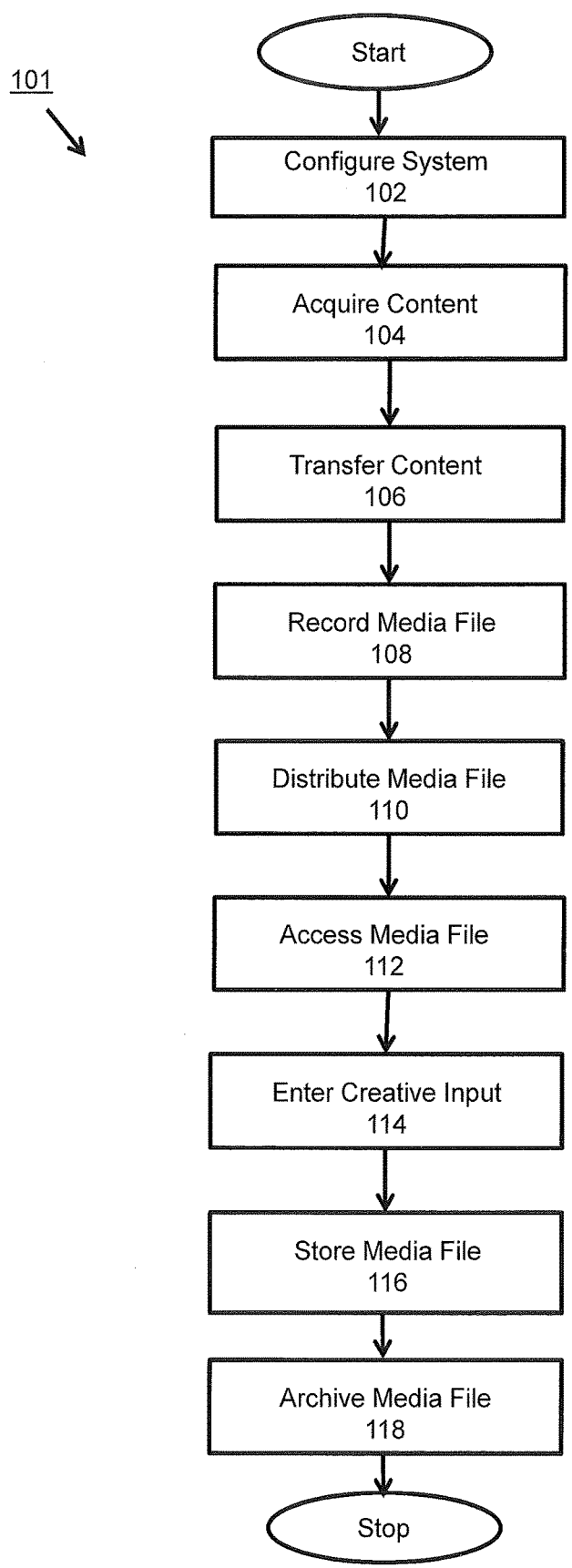
FIG. 2 is a flow chart for acquiring, reviewing, and processing media files according to one embodiment of the invention.

FIG. 2 is a flow chart illustrating the method of operation 101 of one embodiment of the present invention for reviewing media files. The system 21 is first configured for a given task during a creative asset development project at step 102. Content is acquired, rendered, or sourced by or through the use of the content source 31 at step 104. The content may be, for example, static and/or dynamic images along with audio. The content may include primary metadata. The content is available in a form that may be rendered onto media for possible later access, distribution, and further processing. The acquired content is transferred at step 106 from the content source 31 to a central computer device 51 through a communication link 41. At step 108, the content is rendered in an organized fashion such as in a database in memory for immediate or later access, use, and processing. Specifically, the central computer device 51 is configured to render the acquired content on a storage media unit such as primary data in a media file. The media files may be rendered in a database such that the files are associated with each other. Embodiments of the system 101 permit primary metadata to be associated with the rendered primary data.

The media files are distributed to one or more media devices 71 such as to one or more authorized users at step 110 through one or more communication links 61. The media files may be accessed and reviewed at step 112 and creative input—such as edits, annotations, comments, instructions, notes—entered through an interface of the media device at step 114. The creative input is rendered and stored with the media file at step 116. The media file including associated creative input is sent to the central computer device 51 and archived at step 118 so that another or others can consider the creative input and provide additional creative input, if necessary.

One preferred embodiment of the media device 71 includes a GUI that facilitates the use of the system by a user. Certain embodiments allow a user, for example, to control the media device 71, receive and review one or more of the media files presented such as screen views 221 as shown in FIG. 3 through FIG. 15, and interact with the system 21. To assist the user in making decisions regarding the control of the media device 71 and the navigation and use of the screen views 221 and the system 21, embodiments of the system 21 may include graphical controls 241. The graphical controls 241 may be in the form of images, icons, text prompts, text commands, text messages, field boxes, or other graphical elements such as a combination tool that appears on one or more of the screen views 221. The graphical controls 241 allow a user to control and interact with the system 21. In certain embodiments, the direct manipulation of the graphical controls 241 allows actions to be performed, input given, and instructions provided.

Such graphical controls 241 may be used also to confirm how the user has manipulated the system 21 and what media file or files the user has selected. Certain embodiments of the media device 71 include touchscreen technology. However, certain embodiments of the graphical controls 241 may not necessarily require touchscreen technology that is included with many media devices 71 in order to allow a user to access media files within the system 21.

Figure 3:
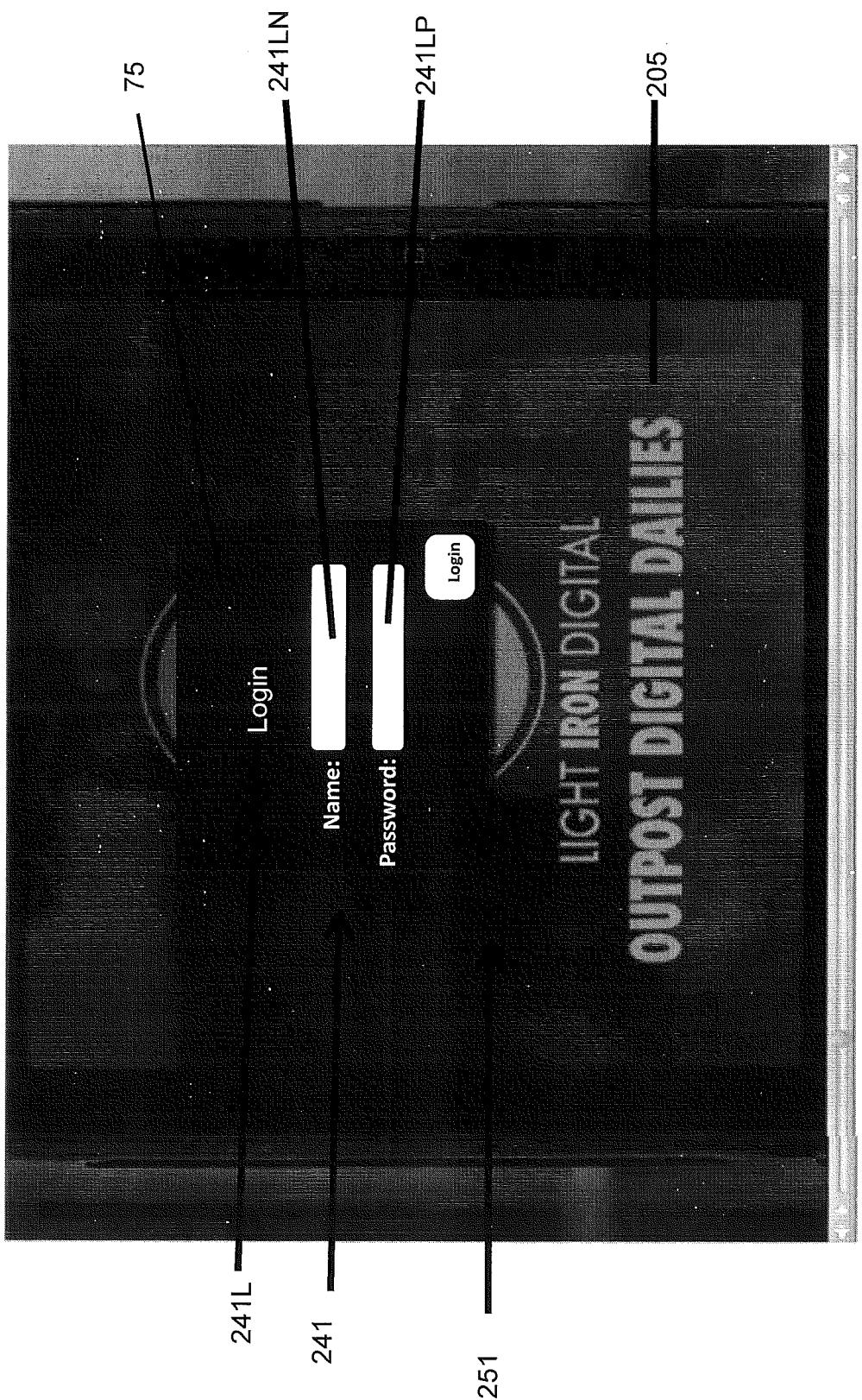
FIG. 3 is a screen view of the user interface of a media device according to one embodiment of the invention.

The system 21 may include one or more security features 75 by which a person controlling the distribution of the media files may select to whom access to the media files will be given. One embodiment of the system 21 includes a security feature 75 that is presented to a potential user through the media device 71 as a screen view 221 and is shown in FIG. 3. The illustrated embodiment of the security feature 75 includes a graphical control 241 on the surface 205 of the screen view 221—a text prompt "Login". The Login component 241L includes a name field box 241LN—into which a potential user of the system 21 must type in a name—and a password field box 241LP—into which a potential user must enter a password in order for the potential user to become an actual user of at least a portion of the system 21 and gain access to some or all of the media files. Embodiments of the system 21 may include different or additional components and methods by which the content may be kept secure.

Certain embodiments of the system 21 that utilize a media device 71 that includes touch screen technology allows interaction with the system 21 simply by touching chosen areas 251 of the surface 205 of the screen view 221. Such screen areas 251 are graphical controls 241 and react to the touch of the user on the screen surface 205 of the media device 71. A variety of images may be used to identify to the user which areas 251 of the screen surface 205 may be touched to produce a certain reaction by the system 21. For example, the screen areas 251 may be visually presented as the surface of three-dimensional buttons. Unless specifically stated otherwise, for purposes of this application, the term "button" will mean a screen area 251 of a media device 71 that includes touchscreen technology that reacts to the touch of the user (or apparatus manipulated by the user) on the screen surface 205 and thereby forms a graphical control 241.

Figure 4:
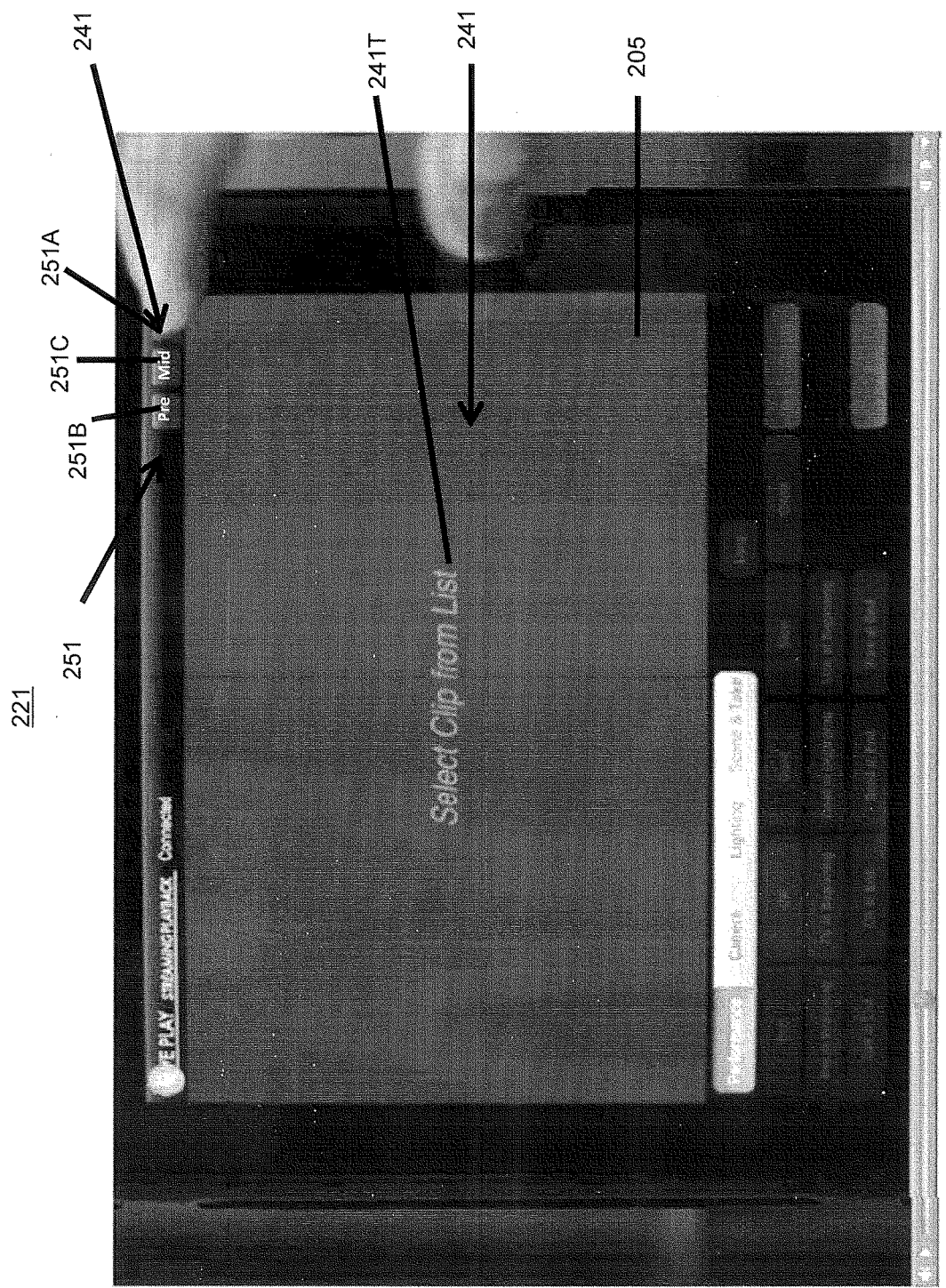
FIG. 4 is a screen view of the user interface of a media device according to another embodiment of the invention.

FIG. 4 through FIG. 9 illustrate certain embodiments of the system 21 that provides to the user access to the one or more clips rendered and made available as media files by the system 21. FIG. 4 illustrates an embodiment in which appears on the screen view 221a graphical control 241. One graphical control 241 is a tool 241T, presented as a text message "Select Clip from List". This tool 241T suggests that the user touch a graphical control 241—the screen area 251A which is presented as a button-like image labeled "Clips"—in order to gain access to one or more clips from the media files. In the illustrated embodiment, two additional screen areas 251B, 251C—labeled as "Prev" and "Next"—are positioned adjacent to the "Clips" button. By touching the screen area 251B identified by the "Prev" grouping of letters—that is, the "Prev" button—, the user may return to a previous screen view 221. By touching the screen area 251C identified by the "Next" grouping of letters—that is, the "Next" button—, the user may cause the system 21 to provide a new screen view 221.

Figure 5:
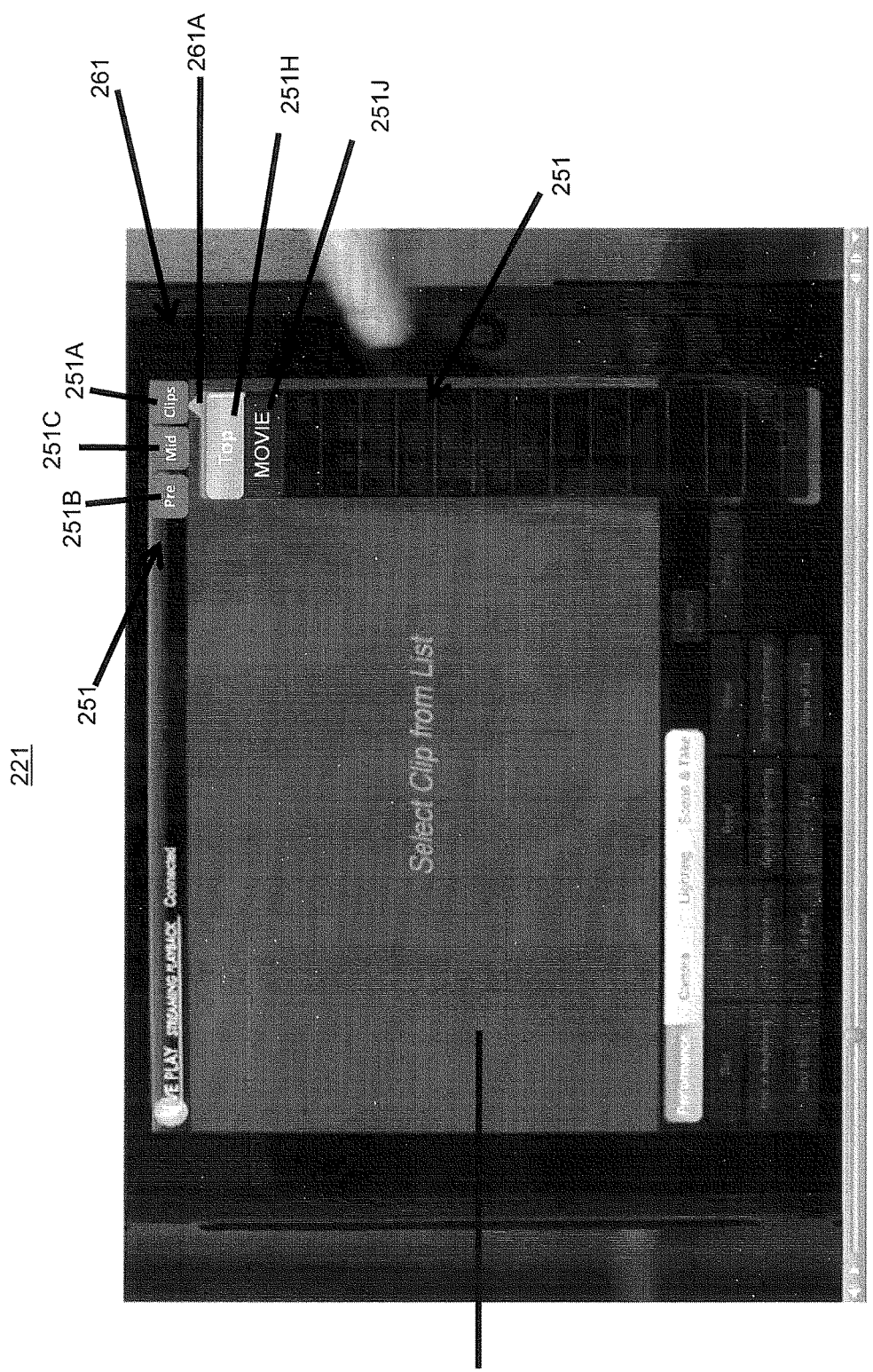
FIG. 5 is a screen view of the user interface of a media device according to another embodiment of the invention.

Certain embodiments of the invention may include a "drop-down menu" 261 which appears upon touching of a screen area 251 and may provide one or more buttons and additional options. FIG. 5 illustrates one embodiment of the screen view 221 that appears after the screen area 251A "Clips" is touched. When a user selects the "Clips" button, a drop-down element 261A appears that includes separate screen areas 251H, 251I organized as buttons, two of which are labeled as "Top" and "MOVIE". Selection of the "Top" button 251H on the screen area returns to the "Prev", "Next", and "Clips" buttons described above with reference to FIG. 4.

Figure 6:
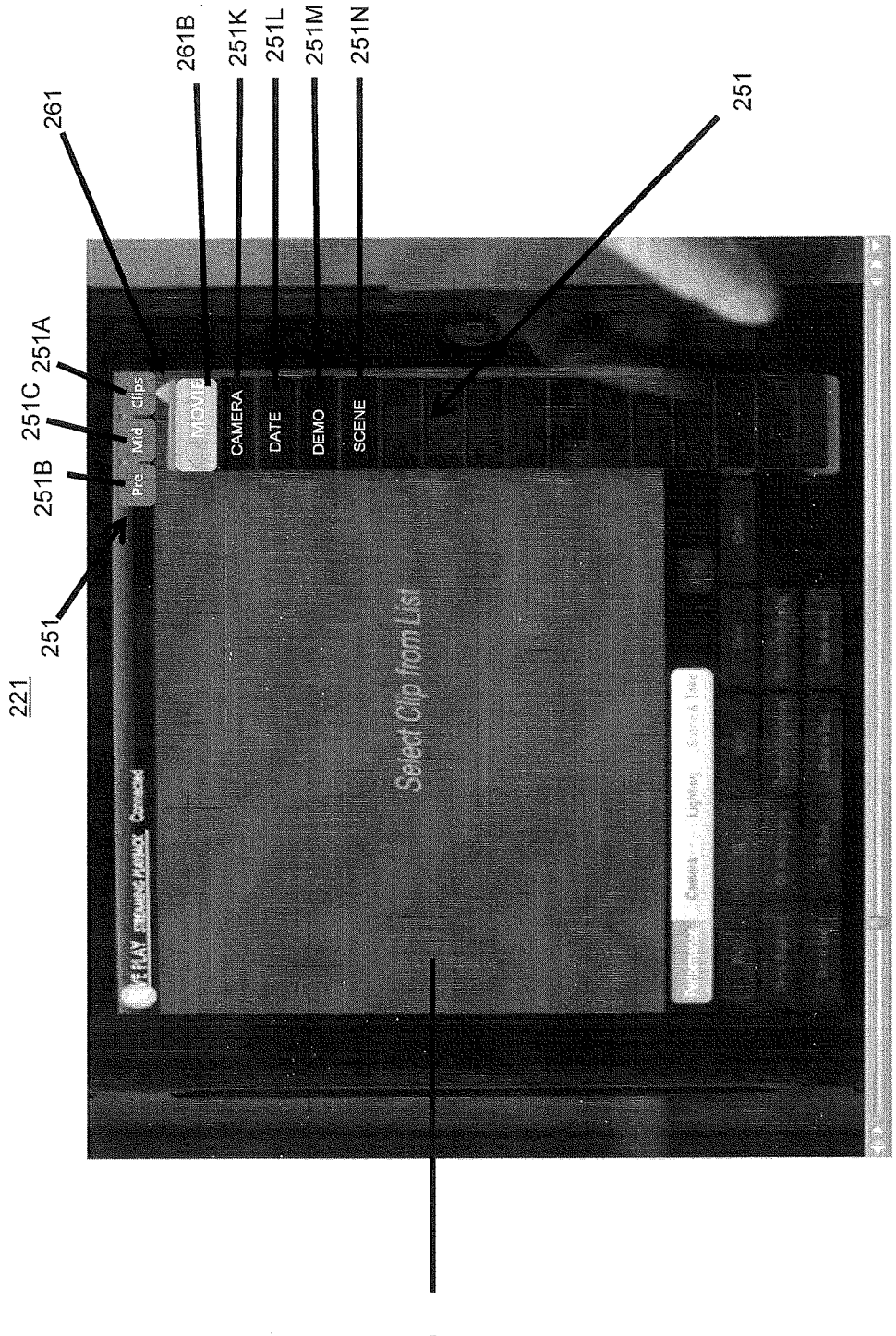
FIG. 6 is a screen view of the user interface of a media device according to another embodiment of the invention.

If a user selects the "MOVIE" button on the screen area 251J, then another drop-down element 261B appears as shown in FIG. 6 that includes separate screen areas 251K, 251L, 251M, 251N organized as buttons labeled "CAMERA", "DATE", "DEMO", and "SCENE". Each of the drop-down elements 261 described herein may be engaged to provide "scrolling" action downward or upward to facilitate the selection of additional buttons that are not initially shown on the drop-down element 261.

By touching the CAMERA button shown in the FIG. 6 screen view 221, another drop-down element 261C appears (not shown) that allows a user to review acquired video clips from one or more different cameras.

Figure 7:
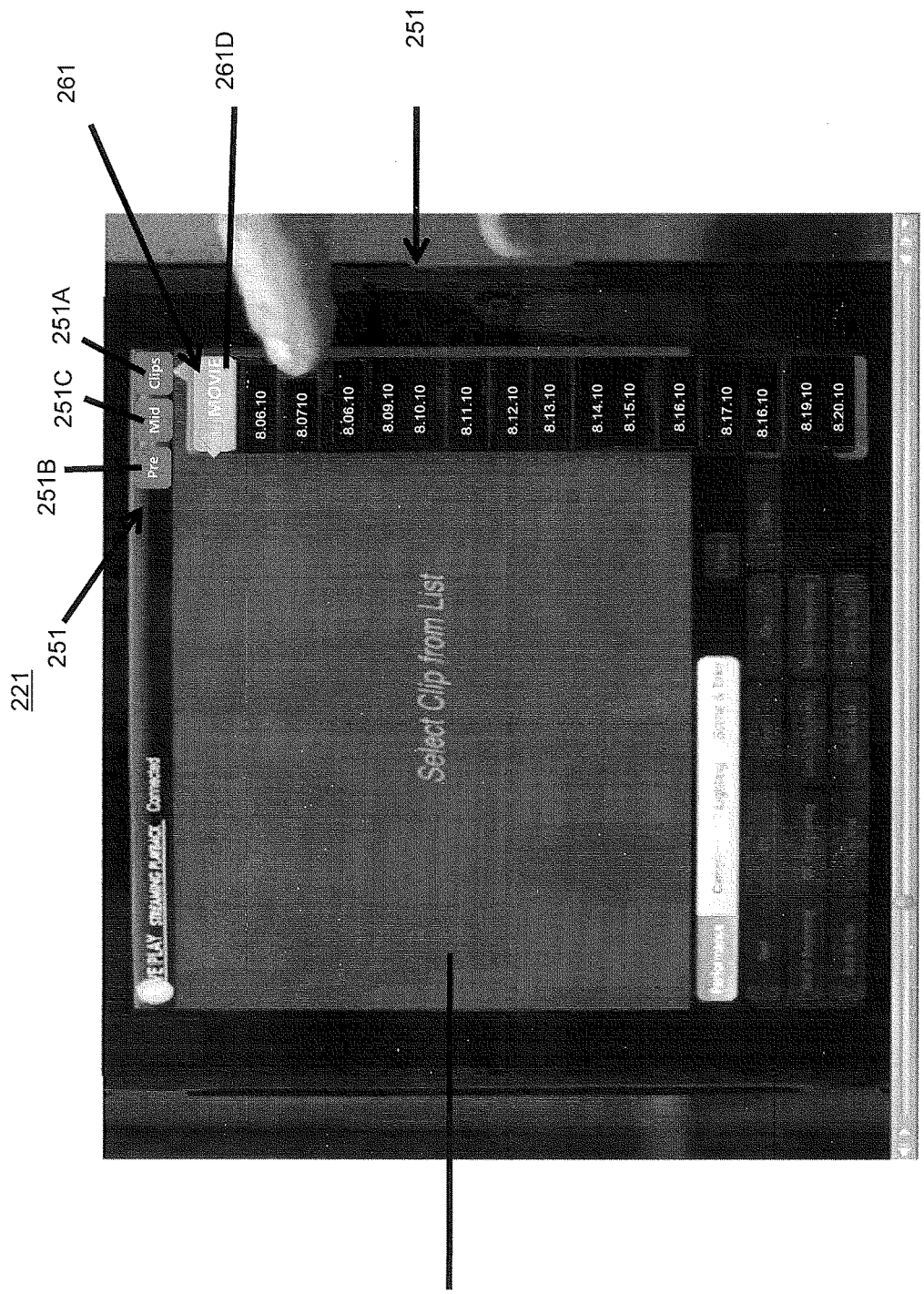
FIG. 7 is a screen view of the user interface of a media device according to another embodiment of the invention.

By touching the DATE button of the FIG. 6 embodiment, a drop-down element 261D is generated as shown in FIG. 7. The drop-down element 261D of FIG. 7 presents a menu of acquired content that is organized by date. The dates may be in chronological, reverse chronological, or other order. By touching one of the screen areas 251 that are labeled buttons (e.g., one labeled "8.07.10"), the user may be presented with content acquired or otherwise placed in association with the stated date. A user may also engage one or more other buttons that appear in the "DATE" drop-down element 261D.

Figure 8:
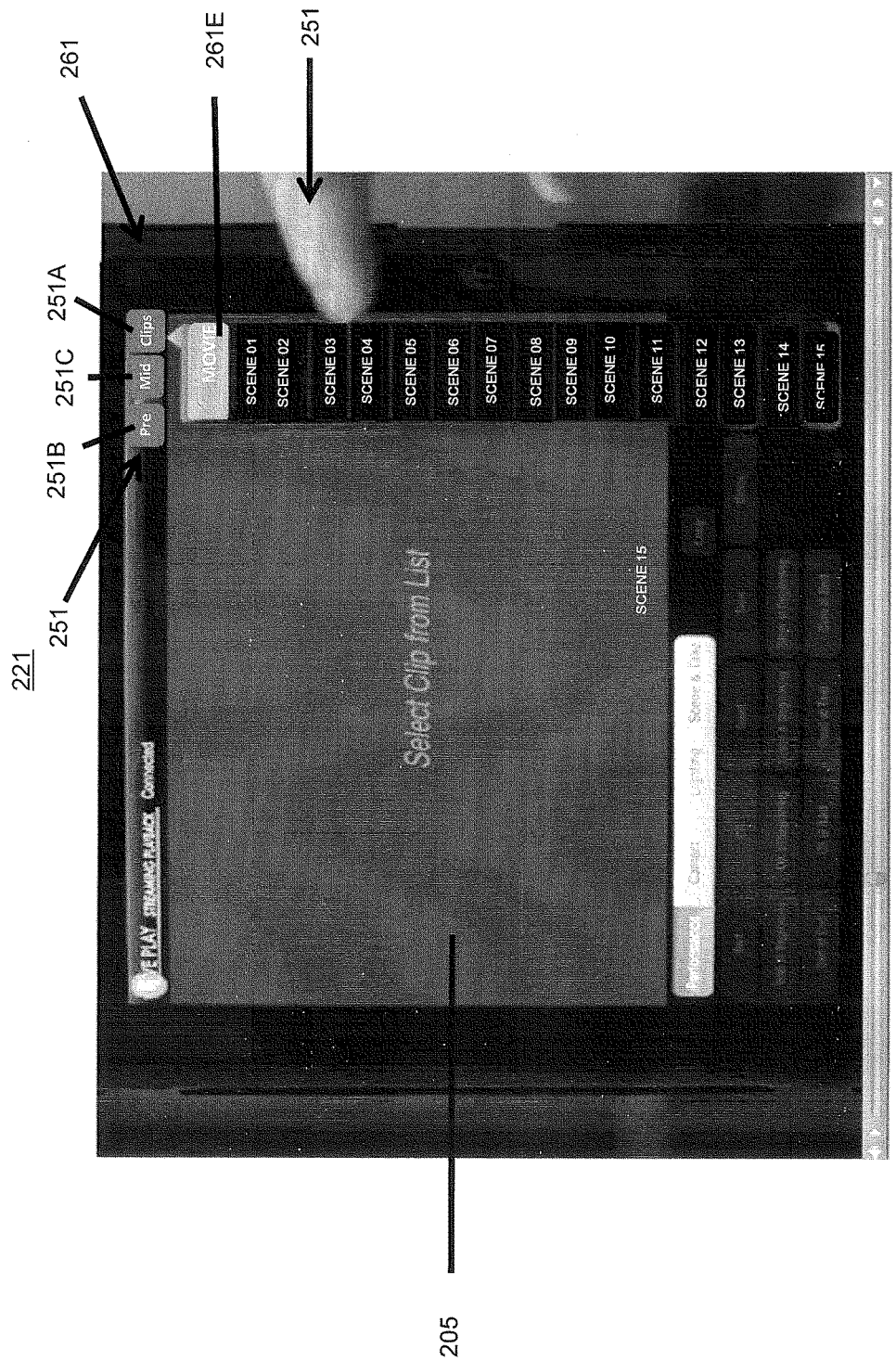
FIG. 8 is a screen view of the user interface of a media device according to another embodiment of the invention.

Similarly, as illustrated in FIG. 8, a selection of the SCENE button in FIG. 6 generates a drop-down element 261E that includes screen areas 251 that are buttons labeled according to the number of the scene of acquired content. By touching one of the scene selection buttons (e.g., one labeled "SCENE 04"), one or media files—such as clips acquired during the filming of that scene—can appear on the surface 205 of the screen view 221.

Figure 9:
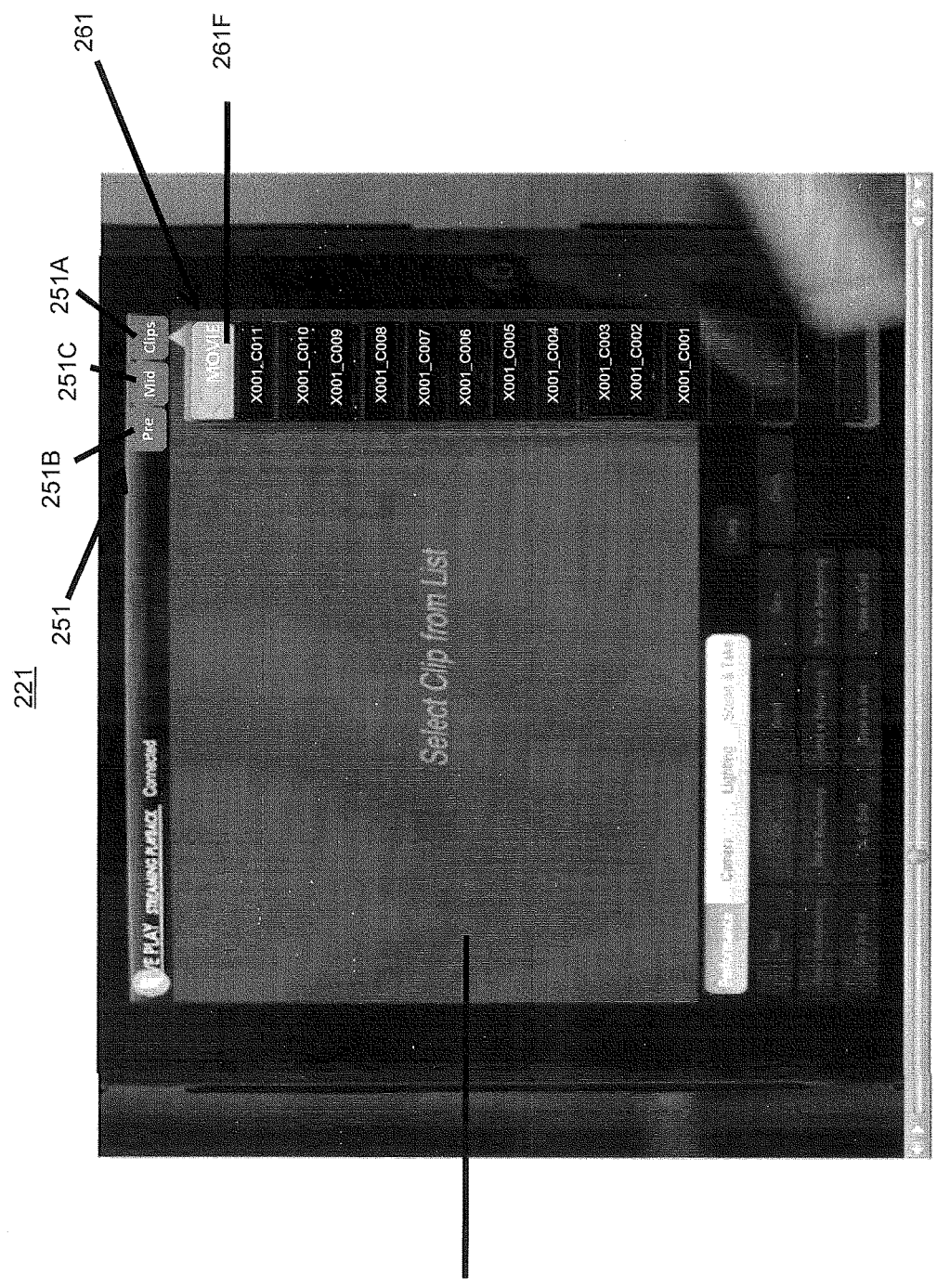
FIG. 9 is a screen view of the user interface of a media device according to another embodiment of the invention.

Selection of the button labeled "DEMO" of the embodiment shown in FIG. 6 generates a drop-down element 261F that lists content rendered as media files by one or more designations, including as the letter and number designations shown in FIG. 9.

By touching a button shown in the drop-down element 261F—for example, a certain specific media file (e.g., one identified by the designation "X001_C001")—can be made available for review. The embodiment illustrated in FIG. 9 shows that by touching the button identified as "X001_C001" a specific video clip appears on the surface 205 of the screen view 221. It is contemplated that the media device 71 may confirm the number of the media file that is being reviewed using a graphical control 241 such as a text confirmation positioned along the upper edge of the surface 205 of the screen view 221. The text confirmation allows the user to confirm that the media file presented is identified by the specific designation "X001_C001".

Figure 10:
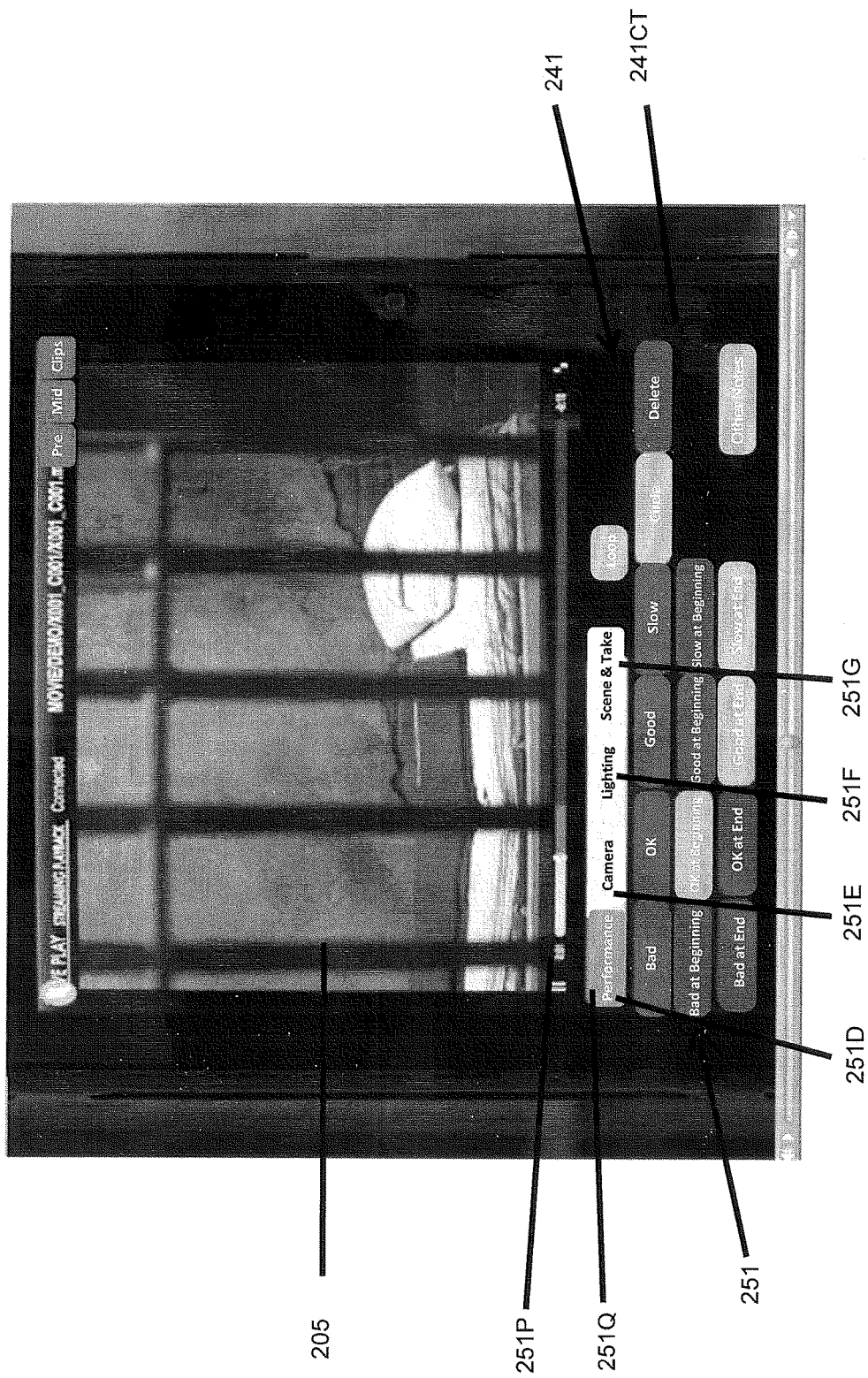
FIG. 10 is a screen view of the user interface of a media device according to another embodiment of the invention.

FIG. 10 illustrates an embodiment of the system 21 in which a media file is being played on the surface 205 of the screen view 221 of the media device 71. Embodiments of the system 21 may include a graphical control 241 that is in the form of a combination tool 241CT. The combination tool 241CT provides additional information to the user regarding the media file that has been selected and permits control of the media file.

FIG. 10 illustrates one embodiment of such a combination tool 241CT that includes various screen areas 251. The screen area 251N is organized as a control component and screen area 251Q is organized as buttons. The control component allows the user to begin, advance to a certain portion, pause, and stop the playing of the media file. The amount of the media file that has been played and the length of the time played each may be shown graphically and in text as part of the combination tool 241CT.

FIG. 10 shows an embodiment of the media device 71 in which various screen areas 251D, 251E, 251F, 251G are shown in brighter and lighter color such that they contrast with certain other screen areas 251 and the screen view 221. These contrasting screen areas 251D, 251E, 251F, 251G appear as generally rectangular buttons individually labeled as "Performance", "Camera", "Lighting", and "Scene & Take". Camera 251E concerns that which was actually captured by a camera while camera 251K concerns the brand or style of camera. By touching each of these, a separate menu of options will be shown on the screen area 251. One advantage of having separate "Performance", "Camera", "Lighting", and "Scene & Take" buttons is that consumers concerned with only one of these features can readily access those particular screen views 221 to provide comments regarding a particular take. This accessibility to specific areas for reviewing a media file by each consumer advantageously facilitates rapid review, editing and commenting upon the acquired media file. Moreover, since each consumer may access separate mobile devices, another advantage of the system 21 is that multiple reviewers may review, provide comments upon, and edits to acquired media file in real-time and at the same time. Furthermore, since the consumers have access to each media file on-set and immediately after a take has been completed, scenes may be acquired and approved during the same day of filming without any unnecessary delays. Accordingly, costs associated with filmmaking may be reduced. The media files and operations made accessible through the engagement of each of these four buttons are now discussed.

As shown FIG. 10, the "Performance" button has been selected (brighter color). Such selection provides a menu by which the user may enter commentary regarding the media file shown in the surface 205 of the screen view 221. Examples of such commentary are shown in FIG. 10 and include "Bad", "Bad at Beginning", "Bad at End", "OK", "OK at Beginning", "OK at End", "Good", "Good at Beginning", "Good at End", "Slow", "Slow at Beginning", and "Slow at End", which provide the user with selections for commenting on the quality of the performance. Other buttons by which users can provide input include "Loop", "Circle", "Delete" and "Other Notes".

Figure 11:
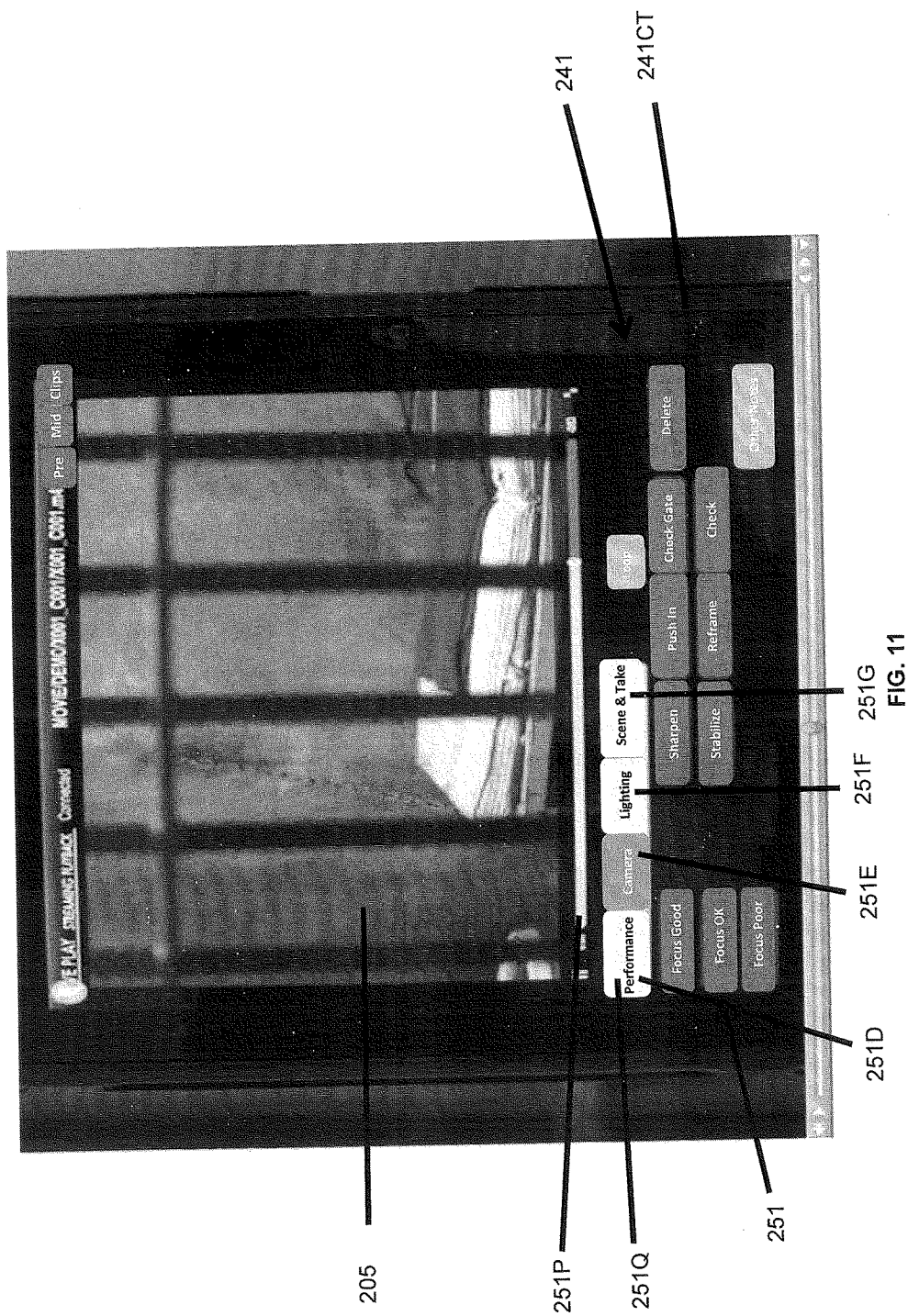
FIG. 11 is a screen view of the user interface of a media device according to another embodiment of the invention.

FIG. 11 shows a screen view 221 when the "Camera" button 251E is selected while a video clip is being viewed. Selection of the "Camera" button generates user input elements for commenting on the acquired media file being reviewed. These user input elements include "Focus Good", "Focus Bad", "Focus Poor", "Sharpen", "Stabilize", "Push In", "Reframe", "Check Gate", and "Check" which indicate characteristics of the camera during the filming of the media file. Also included are the Loop, Delete and Other Notes user input elements as discussed above with respect to FIG. 10.

Figure 12:
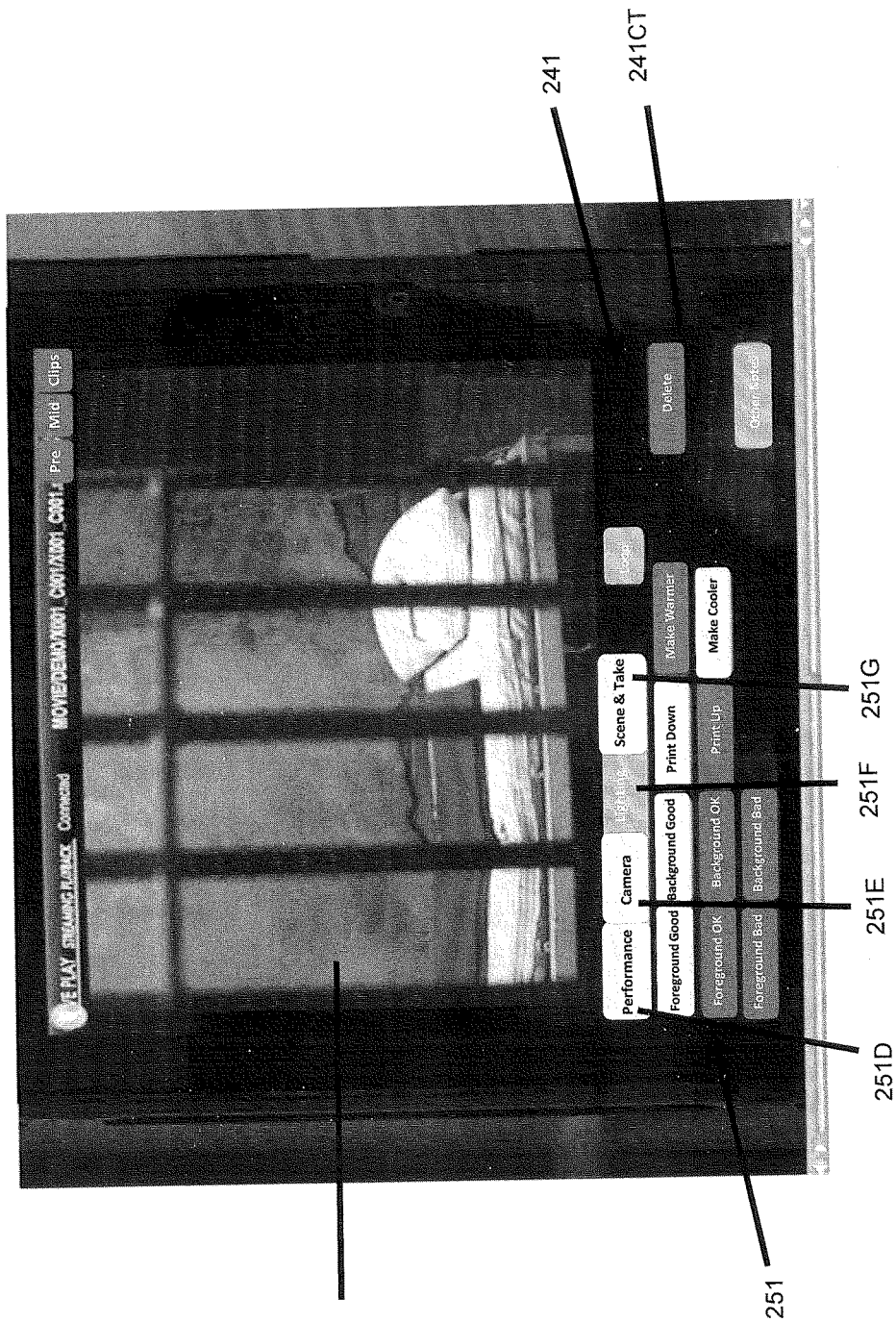
FIG. 12 is a screen view of the user interface of a media device according to another embodiment of the invention.

FIG. 12 illustrates a screen view 221 when the "Lighting" button 251F is selected. Creative input regarding the lighting of the media file may occur by user selection of one or more of: "Foreground Good", "Foreground OK", "Foreground Bad", "Background Good", "Background OK", "Background Bad", "Print Down", "Print Up", "Make Warmer" and "Make Colder". Each consumer is often concerned with different aspects of a filming shoot.

Figure 13:
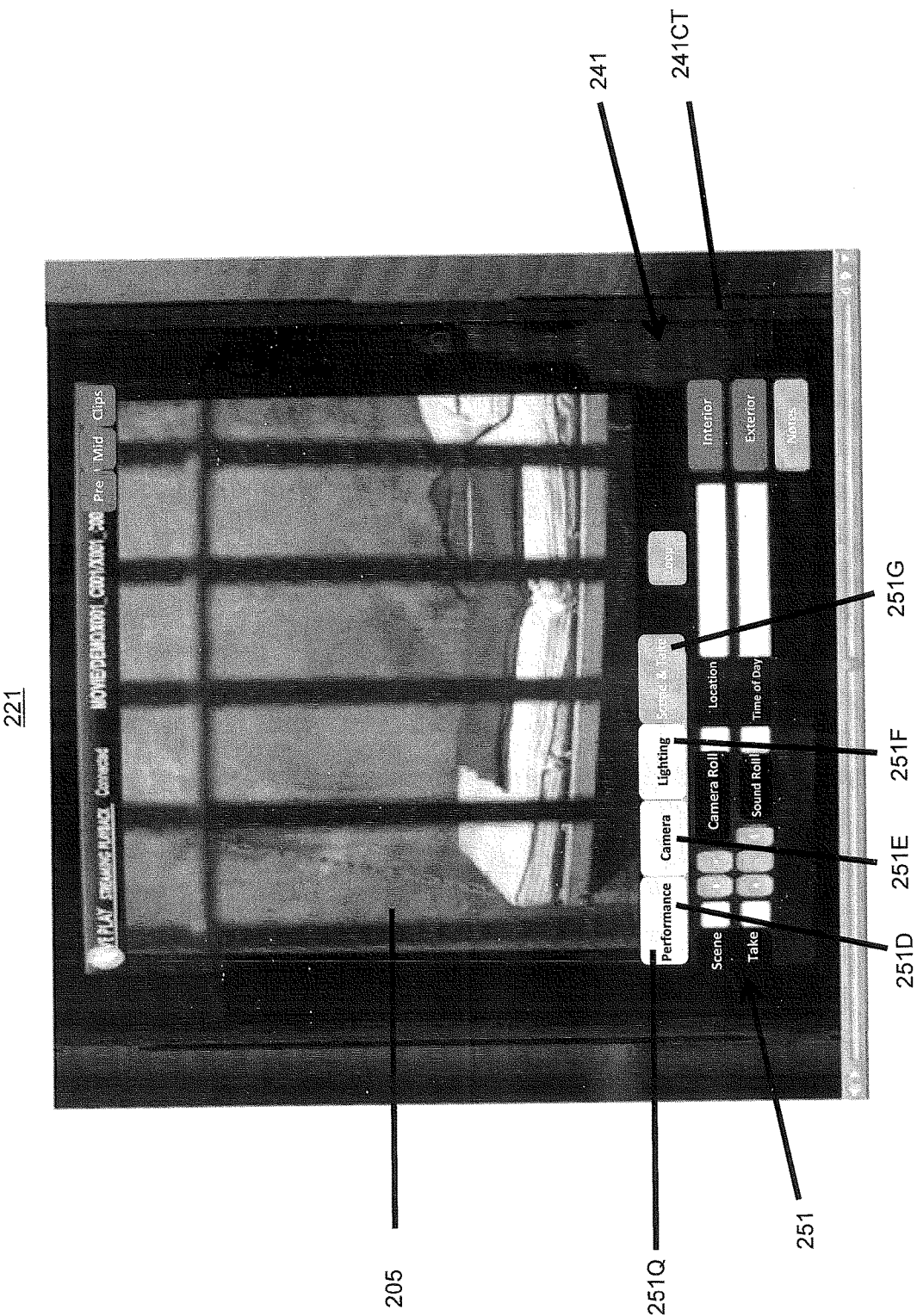
FIG. 13 is a screen view of the user interface of a media device according to another embodiment of the invention.
Figure 14:
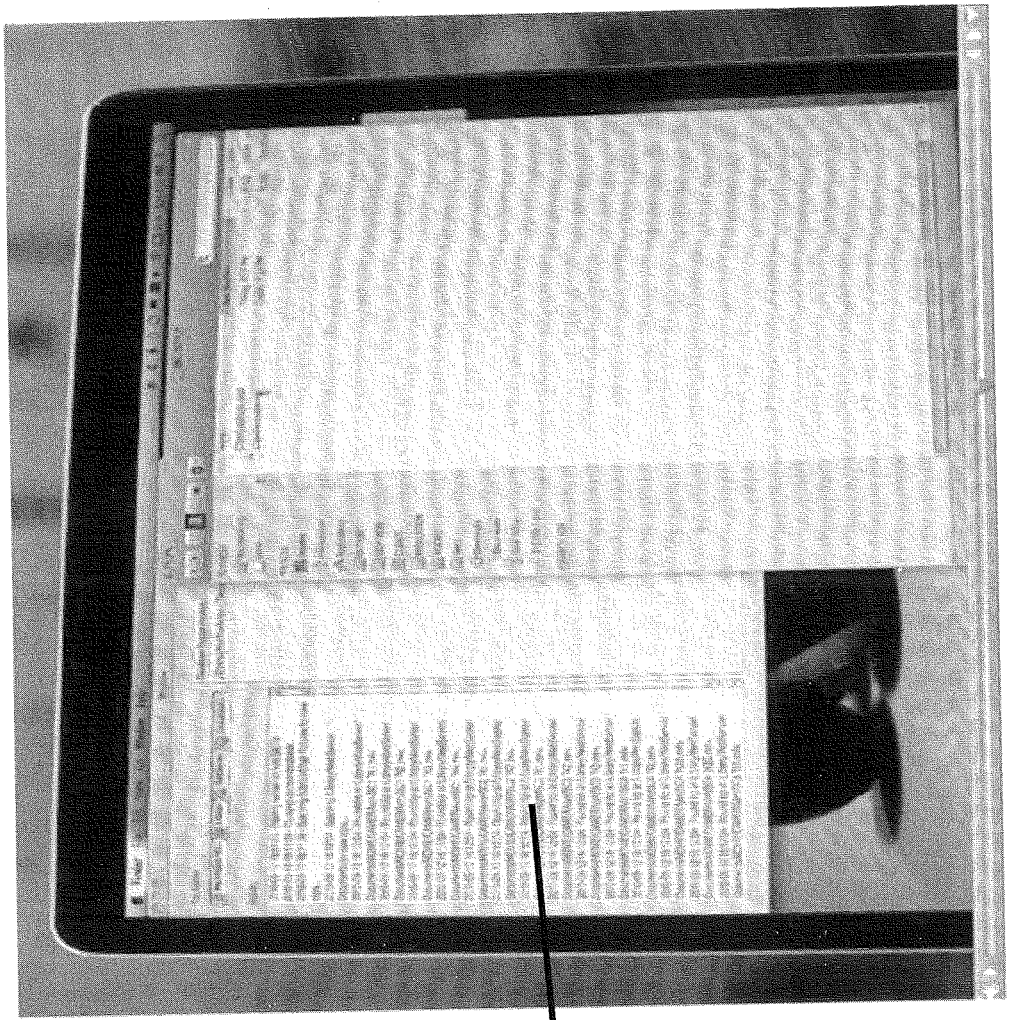
FIG. 14 is a screen view of the user interface of a media device according to another embodiment of the invention.
Figure 15:
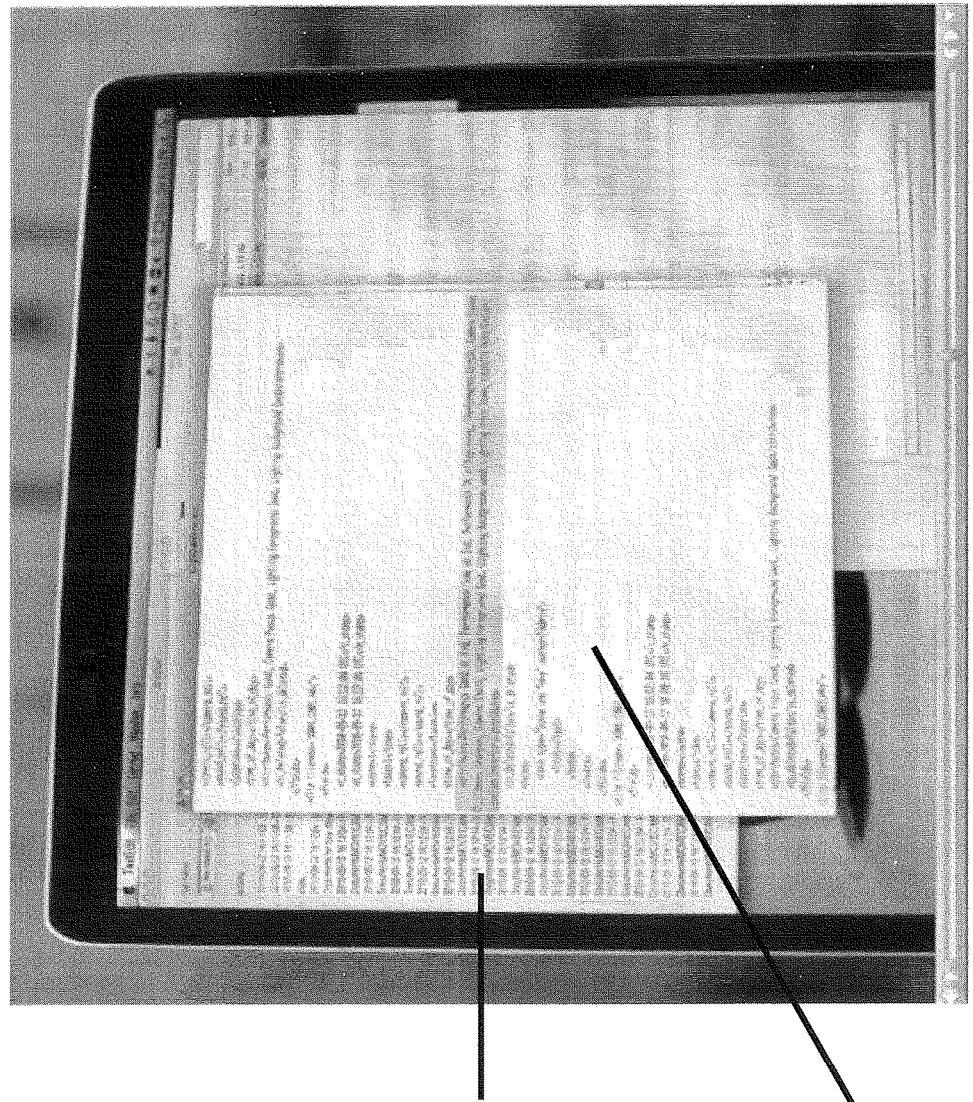
FIG. 15 is a screen view of the user interface of a media device according to another embodiment of the invention.

FIG. 13 illustrates a screen view 221 that appears when the "Scene & Take" button 251G is selected. This screen view 221 allows consumers to select and edit information related to the media file. Both of the "Scene" button and "Take" button have associated up and down user input elements associated therewith for selecting scene and take numbers, respectively. For example, if the third scene is being shot for the second time, a user could select the "Scene" button and count up to three using the associated up arrow and then select the "Take" button and count up to two. Additional buttons include those for indicating the "Camera Roll", "Sound Roll", "Location", "Time of Day", "Interior" and "Exterior". These user input elements permit information to be entered into the system 21 such as what camera and sound rolls acquired the video clip, the location and time of acquiring the video clip, and whether filming was indoors or outdoors. FIG. 14 illustrates a certain embodiment of an interface of the central computer device 51 in which information regarding a plurality of media files 291 is displayed. As illustrated, the media files 291 are arranged as an XML file. In certain embodiments of the present invention, upon selection of one of the media files 291, it is possible to access metadata 293—either primary metadata or creative metadata—associated with the media files 291 as shown in FIG. 15. The highlighted portion of FIG. 15 shows creative metadata in the form of consumer's comments and notes of the selected media file 291. Accordingly, post production editors may readily access the creative metadata to further edit the media file 291 as indicated by the on-set comments and edits of the director and other consumers. Moreover, for creative metadata saved in an XML format, another advantage of the present system 21 is that it is possible to transfer stored creative metadata to other XML applications for further processing such as on-line viewing system programs, etc.

Figure 16:
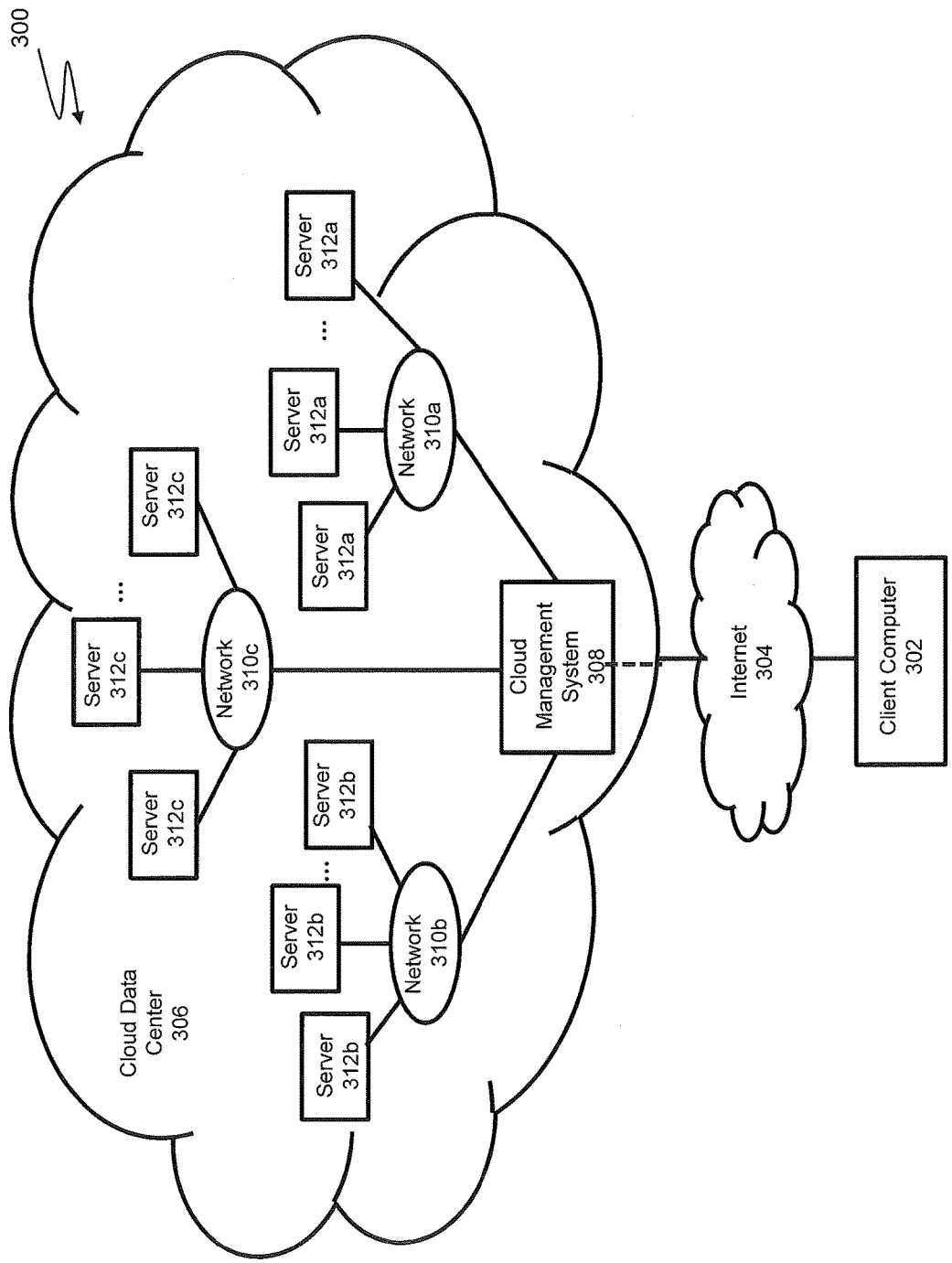
FIG. 16 illustrates an exemplary cloud computing system that may be used to implement the invention.

The invention is configurable to distribute rendered content and facilitate the solicitation and provision of comments and edits through wireless or cloud technologies. FIG. 16 illustrates an exemplary cloud computing system that may be used to implement the invention. FIG. 16 illustrates an exemplary system that may be used to implement the invention, specifically a cloud computing system 300. The cloud computing system 300 includes a plurality of interconnected computing environments. The cloud computing system 300 utilizes the resources from various networks as a collective virtual computer, where the services and applications can run independently from a particular computer or server configuration making hardware less important.

Specifically, the cloud computing system 300 includes at least one client computer 302. The client computer 302 may be any device through the use of which a distributed computing environment may be accessed to perform the methods disclosed herein, such as a content source, central computer device, or media device as described in reference to FIG. 1A and FIG. 1B.

The client computer 302 also includes a communications interface that allows software and instructions to be transferred between the cloud computing system 300 and other devices. The communications interface may be, for example, a modem, a network interface such as an Ethernet card or Wi-Fi component, a communications port, a PCM-CIA slot and card, wired or wireless systems, etc. The communications interface allows communication through transferred signals between the client computer 302 and networks such as the Internet 304 and cloud data center 306. Software and instructions transferred by the communications interface are typically in the form of signals such as electronic, electromagnetic, optical or other signals capable of being sent and received by the communications interface. Signals may be sent and received using wired or wireless technologies including the use of cable, fiber optics, phone line, cellular phone link, Radio Frequency ("RF") link, Wi-Fi link, or any other technology.

The client computer 302 establishes communication with the Internet 304—specifically to one or more servers—to, in turn, establish communication with one or more cloud data centers 306. A cloud data center 306 includes one or more networks 310a, 310b, 310c managed through a cloud management system 308. Each network 310a, 310b, 310c includes resource servers 312a, 312b, 312c, respectively. Servers 312a, 312b, 312c permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as applications or software.

The cloud management system 308 can comprise a dedicated or centralized server and/or other software, hardware, and network tools to communicate with one or more networks 310a, 310b, 310c, such as the Internet 304 or other public or private network, with all sets of resource servers 312a, 312b, 312c. The cloud management system 308 may be configured to query and identify the computing resources and components managed by the set of resource servers 312a, 312b, 312c needed and available for use in the cloud data center 306. Specifically, the cloud management system 308 may be configured to identify the hardware resources and components such as type and amount of processing power, type and amount of memory, type and amount of storage, type and amount of network bandwidth and the like, of the set of resource servers 312a, 312b, 312c needed and available for use in the cloud data center 306. Likewise, the cloud management system 308 can be configured to identify the software resources and components, such as type of Operating System ("OS"), application programs, and the like, of the set of resource servers 312a, 312b, 312c needed and available for use in the cloud data center 306.

The present invention is also directed to computer products, otherwise referred to as computer program products, to provide software to the cloud computing system 300. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 300 of FIG. 16 is provided only for purposes of illustration and does not limit the invention to this specific embodiment. It is appreciated that a person skilled in the relevant art knows how to program and implement the invention using any computer system or network architecture.

Figure 17:
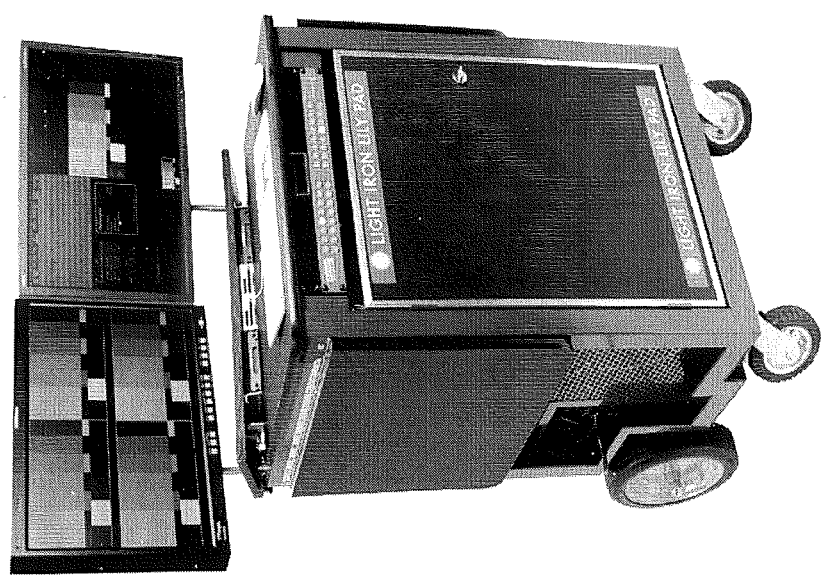
FIG. 17 illustrates one embodiment of a central computer device that may be used to implement the invention.
Figure 18:
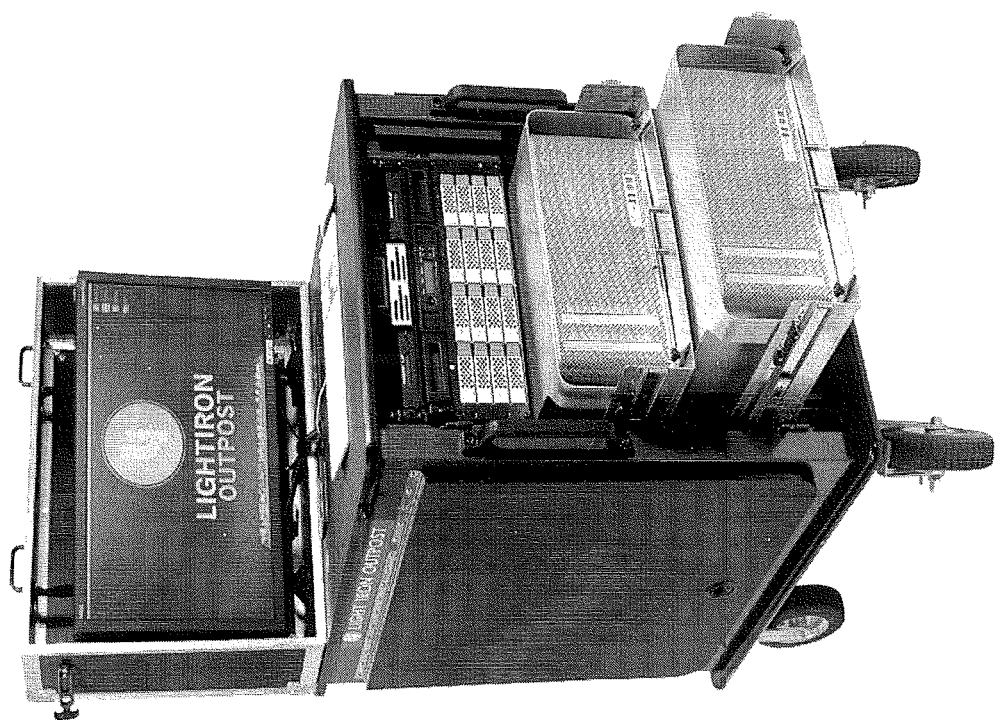
FIG. 18 illustrates another embodiment of a central computer device that may be used to implement the invention.

FIG. 17 and FIG. 18 each illustrate certain embodiments of a central computer device 51 that are compact and movable such as "on-site".

While the invention and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the invention, which is to be limited not by the exemplary embodiments but by the appended claims.

What is claimed is:

1. A system for managing a development of creative content by one or more users, the system comprising:
  a content source stores or acquires content to obtain acquired content, wherein the content source is one or more cameras and the content comprises one or more images;
  a central computer device including a memory, wherein said central computer device receives the acquired content from said content source through a first communication link, said central computer renders the acquired content within said memory to obtain rendered content stored as a media file; and
  a plurality of media devices, each of said media devices including a user interface and a display, and each of said media devices including a second communication link through which each of said media devices selects and receives the media file from said central computer device and displays the rendered content on a content area of said display, creative input is entered on said user interface and associated with the rendered content to obtain reviewed content stored as an updated media file, each of said user interface comprising a first group of selectable buttons for selecting the rendered content and a second group of selectable buttons for entering creative input,
    the first group of selectable buttons comprising a graphical drop-down menu element for selecting the media file and display of the rendered content on the content area, a first button identifying the rendered content based on the one or more cameras that recorded the rendered content, a second button identifying the rendered content based on a date the rendered content was recorded, a third button identifying the rendered content based on a letter and a number designation of the media file, a fourth button identifying the rendered content based on a scene number,
    the second group of selectable buttons comprising a graphical linear menu element for entering creative input on the content area, a fifth button to receive input regarding the one or more cameras that recorded the rendered content, a sixth button to receive input regarding a quality of a performance of the rendered content, a seventh button to receive input regarding lighting of the rendered content, an eighth button to receive input regarding a scene number and a take number of the rendered content; and
  said updated media file including the reviewed content is transferred to said central computer device and archived in said memory.

2. The system for managing the development of creative content by one or more users according to claim 1, wherein the rendered content comprises primary data including primary metadata.

3. The system for managing the development of creative content by one or more users according to claim 1, wherein the creative input comprises creative metadata.

4. The system for managing the development of creative content by one or more users according to claim 1, wherein the rendered content is accessed by an authorized user.

5. The system for managing the development of creative content by one or more users according to claim 1, wherein said memory of said central computer device further comprises a database.

6. The system for managing the development of creative content by one or more users according to claim 1, wherein said user interface is a touch screen.

7. The system for managing the development of creative content by one or more users according to claim 1, wherein the media device is an iPad®.

8. The system for managing the development of creative content by one or more users according to claim 1, wherein the second communication link is a wireless link.

9. The system for managing the development of creative content by one or more users according to claim 1, wherein said user interface further comprises a selectable button for entering creative input according to the selected scene identifier and the selected take identifier of the rendered content.

10. The system for managing the development of creative content by one or more users according to claim 1, wherein the rendered content is a motion picture.

11. The system for managing a development of creative content by one or more users according to claim 1, wherein the creative input is entered simultaneously on the user interface of each of the one or more media devices.

12. The system for managing a development of creative content by one or more users according to claim 1, wherein the creative input is entered in real-time on the user interface of each of the one or more media devices.

13. The system for managing a development of creative content by one or more users according to claim 1, wherein the creative input is entered both simultaneously and in real-time on the user interface of each of the one or more media devices.

14. A method for managing a development of creative content by one or more users, the method comprising the steps of:

storing or acquiring content by a content source to obtain acquired content;

transferring the acquired content from the content source to a central computer device through a first communication link;

rendering the acquired content in a database in memory of the central computer device;

selecting on an interface of one or more media devices the rendered content using a graphical drop-down menu comprising four buttons, a first button identifying the rendered content based on one or more cameras that recorded the rendered content, a second button identifying the rendered content based on a date the rendered content was recorded, a third button identifying the rendered content based on a letter and a number designation of the media file, a fourth button identifying the rendered content based on a scene number;

distributing the selected content though a second communication link to the one or more media devices;

illustrating the selected content on a display of each of the one or more media devices;

receiving creative input through the interface of each of the one or more media devices using one or more buttons of a graphical linear menu element, a fifth button receiving input regarding the one or more cameras used to record the selected content, a sixth button receiving input regarding a quality of a performance of the selected content, a seventh button receiving input regarding lighting of the selected content, an eighth button receiving input regarding a scene number and a take number of the selected content;

associating the creative input and the selected content to obtain reviewed content;

sending the reviewed content from each of the one or more media devices to the central computer device; and storing the reviewed content.

15. The method for managing the development of creative content by one or more users according to claim 14, wherein the stored or acquired content of said rendering step is rendered as primary data in a media file.

16. The method for managing the development of creative content by one or more users according to claim 14, wherein said distributing step only occurs to the one or more media devices that is designated as authorized.

17. The method for managing the development of creative content by one or more users according to claim 14, wherein the creative input is at least one selected from the group of: edits, annotations, comments, instructions, and notes.

18. The method for managing the development of creative content by one or more users according to claim 14, wherein said storing the reviewed content step further comprises the step of archiving the acquired content to obtain archived content.

19. The method for managing the development of creative content by one or more users according to claim 18, wherein the archived content is archived according to at least one selected from the group of: content, date, time, unique identifier.

20. The method for managing the development of creative content by one or more users according to claim 14, further comprising the steps of:

accessing the reviewed content by a second media device;

illustrating the reviewed content on a display of the second media device;

receiving additional creative input through an interface of the second media device;

associating the additional creative input and the reviewed content to obtain further reviewed content;

sending the further reviewed content from the second media device to the central computer device; and storing the further reviewed content.

* * * * *